United States Patent [19]
Yokoyama

[11] Patent Number: 6,166,826
[45] Date of Patent: Dec. 26, 2000

[54] PRINTING APPARATUS, PRINTING METHOD, AND PRINTING SYSTEM

[75] Inventor: Shoji Yokoyama, Nagano, Japan

[73] Assignee: Seiko Epson Corporation, Tokyo, Japan

[21] Appl. No.: 09/047,384

[22] Filed: Mar. 25, 1998

[30] Foreign Application Priority Data

Mar. 25, 1997 [JP] Japan .................................... 9-072213

[51] Int. Cl.$^7$ .................................................... H04N 1/00
[52] U.S. Cl. ......................... 358/1.16; 358/1.17; 358/403; 358/407; 358/440; 399/8; 399/9; 399/11; 399/76; 399/177; 399/85
[58] Field of Search .................................. 358/403, 407, 358/434, 440, 444, 468, 402, 1.16, 1.17; 710/13; 399/8, 9, 11, 76, 177, 85

[56] References Cited

U.S. PATENT DOCUMENTS

| | | | |
|---|---|---|---|
| 5,452,099 | 9/1995 | VonMeister | 358/403 |
| 5,561,815 | 10/1996 | Takata et al. | 710/13 |

Primary Examiner—Edward L. Coles
Assistant Examiner—Twyler Lamb
Attorney, Agent, or Firm—Sughrue, Mion, Zinn, Macpeak & Seas, PLLC

[57] ABSTRACT

A printing apparatus is disclosed which comprises print means for printing input print data on a print recording medium, the print means driven by the input print data, storage means for storing the print data, storage control means for determining whether or not storage specification is set in the print data and storing the print data in the storage means as a file if the storage specification is set, attribute information transfer means for transferring attribute information of the file stored in the storage means to a source issuing the attribute information transfer request in response to an input attribute information transfer request, file conversion means for converting the file stored in the storage means into an image data file in response to an image data file transfer request input based on the attribute information, image data file transfer means for transferring the image data file to a source issuing the image data file transfer request, and reprint means for reading the file stored in the storage means and causing the print means to print the file in response to an input print request.

36 Claims, 16 Drawing Sheets

FIG. 15

|  |  |  | 53 | 54 | 81 |
|---|---|---|---|---|---|
|  |  |  | DISPLAY | PRINT | DELETE |
| FILE NAME | USER NAME | TIME | DATE | DATA SIZE | |
| Abc.EPS | UserA | h1 : m1 : s1 | M1 / D1 / Y1 | Dsize1 | —82 |
| Def.EPS | UserB | h2 : m2 : s2 | M2 / D2 / Y2 | Dsize2 | |
| Ghi.PS | UserC | h3 : m3 : s3 | M3 / D3 / Y3 | Dsize3 | —82 |
| Jkl.PS | UserD | h4 : m4 : s4 | M4 / D4 / Y4 | Dsize4 | |

FIG. 17

| | FILE NAME | USER NAME | TIME | DATE | DATA SIZE |
|---|---|---|---|---|---|
| PRINTING | | | | | |
| | Abc.EPS | UserA | h1 : m1 : s1 | M1 / D1 / Y1 | Dsize1 |
| PRINTED | | | | | |
| | Def.EPS | UserB | h2 : m2 : s2 | M2 / D2 / Y2 | Dsize2 |
| | Ghi.PS | UserC | h3 : m3 : s3 | M3 / D3 / Y3 | Dsize3 |
| | Jkl.PS | UserD | h4 : m4 : s4 | M4 / D4 / Y4 | Dsize4 |
| | . | . | . | . | . |
| | . | . | . | . | . |
| | . | . | . | . | . | ns
PRINTING APPARATUS, PRINTING METHOD, AND PRINTING SYSTEM

BACKGROUND OF THE INVENTION

1. Technical Field of Invention

The present invention relates to a printing apparatus, a printing method, and a printing system comprising a storage unit, such as a hard disk drive, and in particular to a printing apparatus, a printing method, and a printing system which enables a file stored in the storage unit to be read, specified, and reprinted.

2. Description of the Related Art

For example, a printing apparatus such as an ink jet printer or a laser printer controls a print engine based on print data received from a host computer for executing predetermined printing. In the host computer, the documents to be printed are prepared with various application programs such as a document preparation program and a drawing preparation program.

If the user wants to print one of the prepared documents, the document is converted into predetermined print data corresponding to the printing apparatus for printing the document by a printer driver corresponding to the printing apparatus. The print data is transferred to the printing apparatus connected to the host computer. The print data from the host computer is first stored in a reception buffer in the printing apparatus, next expanded into bit image data in a work area provided in a memory, then the bit image data is written into an output buffer. The data stored in the output buffer is transferred to a print head section in accordance with a predetermined technique and is printed.

With normal printing apparatus, print data is discarded after printing. If the user later wants to reprint one of the documents printed in the past, the steps of preparing the print data, expanding the print data into the bit image data, etc., will be executed again.

In recent years, occasion to print not only text data, but also image data having a large amount of data has increased. To reprint image data, a large amount of print data must be again transferred to a printing apparatus, which requires a long transfer time, prolonging the time to the print end.

A printing apparatus which is provided with a storage unit, such as a hard disk drive or a flash memory, and can store print data input from a host computer in the storage unit is also proposed.

Since the conventional printing apparatus comprises the storage unit, a file printed in the past (print data file) can be called and specified, whereby it can be reprinted. Therefore, the host computer need not prepare the print data and the print data stored in the printing apparatus needs only to be specified, so that a large amount of print data, such as image data, can be printed promptly.

However, in the conventional printing apparatus, the files stored in the storage unit are managed according to the file names specified when the files are input from the host computer, thus the user must specify the file to be reprinted with only the file name as a key. Therefore, since the user may specify a file different from the desired file; erroneous print easily occurs and there is a problem in ease of use. A user can grasp the correspondence between the file names and the file contents when a few number of files are stored in the storage unit. However, as the number of stored files grows, it becomes difficult to grasp the correspondence between the file names and the file contents and the possibility of erroneous print rises.

Particularly, in recent years, occasion to share a printing apparatus under a network environment, such as a LAN (local area network) or an intranet, has increased. With such a network printer, a number of users store a number of files in the storage unit of the printing apparatus by giving adequate file names to the files, thus it furthermore becomes difficult to accurately grasp the correspondence between the file names and the file contents.

FIG. 17 is a schematic representation to show how to specify reprint with the conventional printing apparatus. Information on the files stored in the storage unit of the printing apparatus and the current file being printed can be read by using a dedicated utility program installed in the host computer. The file name of the current file being printed, the user name of the user making a request for printing the file, the time, the date, and the data size are displayed in the upper part of FIG. 17. The file names of already printed files and the like are displayed in the lower part of FIG. 17. It is difficult to specify the file to be reprinted only by attribute information of the file name, the user name, the data size, the print time and date, etc., and erroneous print easily occurs.

SUMMARY OF THE INVENTION

It is therefore an object of the present invention to provide a printing apparatus, a printing method, and a printing system which enables the user to check image data of files stored in the printing apparatus, whereby erroneous printing can be prevented. It is another object of the present invention to provide a printing apparatus, a printing method, and a printing system which enable the user to check the contents of stored files and which can compress data transferred to check the file contents for shortening the data transfer time. It is still another object of the present invention to provide a printing apparatus, a printing method, and a printing system enabling the user to easily check the contents of stored files.

To the ends, with the printing apparatus according to the present invention, the attribute information of stored files is first transferred, next the image data of files which are selected based on the attribute information is transferred, so that the user can check desired files. The present invention will be discussed with reference to FIG. 1, a functional block diagram.

According to the first aspect of the present invention, there is provided a printing apparatus 1 for printing on a print recording medium by driving a print unit 2 based on input print data and having a storage unit 3 for storing the print data, the printing apparatus comprising a storage control unit 4 for determining whether or not storage specification is set in the print data and storing the print data in the storage unit 3 as a file if the storage specification is set, an attribute information transfer unit 5A being responsive to an input attribute information transfer request for transferring attribute information of the file stored in the storage unit 3 to the source issuing the attribute information transfer request, a file conversion unit 6 being responsive to an image data file transfer request input based on the attribute information for converting the file stored in the storage unit 3 into an image data file, an image data file transfer unit 5B for transferring the image data file to the source issuing the image data file transfer request, and a reprint unit 7 being responsive to an input print request for reading the file stored in the storage unit 3 and causing the print unit 2 to print the file.

For example, a page printing apparatus such as a laser printer, a serial printer such as an ink jet printer or a thermal transfer printer, a line printer, or the like can be used as the "printing apparatus 1." For example, a hard disk drive, a flash memory, a magneto-optic disk drive, a digital audio tape unit, or any other storage unit can be used as the "storage unit 3."

The storage control unit 4 interprets print data and determines whether or not storage specification is set in the print data and if the storage specification is set, stores the print data in the storage unit 3 as a file. To store the file in the storage unit 3, print data described in a predetermined print command system, such as ESC/P or ESC/Page, may be stored as it is, or the file may be stored as an intermediate code file comprising the print data expanded into intermediate code, a bit image file into which an intermediate code file is expanded, or a compressed file provided by compressing a bit image file. If the file is stored as a bit image file, it can be reprinted rapidly; if the file is stored as print data, the data amount can be decreased.

If the user wants to reprint a file printed in the past, an attribute information transfer request is issued. The "attribute information" means bibliographical information of each file, such as the file name of the file, the user name of the person entering the file, the printing date and time of the file, the file size, and the file format.

If an attribute information transfer request is issued, the attribute information of the files stored in the storage unit 3 is read and is transferred by the attribute information transfer unit 5A, whereby the user can obtain the attribute information of all files stored in the storage unit 3 and can narrow down the files to be reprinted based on the attribute information. To issue an attribute information transfer request, the files are previously filtered according to various pieces of retrieval information, such as the file format, the printing date and time, and the user name, whereby only the attribute information of the files having a predetermined file format or only the attribute information of the files prepared by a specific user can be provided.

If the user can specify a desired file according only to the attribute information, immediately the user may make a request for printing the file. However, for example, if an enormous number of files are stored in the storage unit 3, the files can be narrowed down to a reasonable number of files according to the attribute information, but it is difficult to specify the desired file. Then, an image data file transfer request is issued to check the contents of the candidate files to which a large number of files are narrowed according to the attribute information. The expression "image data file" is used to mean a file consisting of the print image data of the stored files.

When an image data file transfer request is issued, the files related to the transfer request are read from the storage unit 3 and the read files are converted into an image data file by the file conversion unit 6. Then the image data file is transferred by the image data file transfer unit 5B. The user can select and specify any desired file from among the candidate files according to the image data file. If the files are stored in the storage unit 3 in the bit image data format, they need not be converted.

When the user selects a desired file based on reference result of the image data file, a request for printing the selected file is issued. In response to the print request, the reprint unit 7 reads the file from the storage unit 3 and causes the print unit 2 to print the file contents.

According to the second aspect of the present invention, the file conversion unit 6 can be configured so that it converts the file stored in the storage unit 3 into bit image data and compresses the bit image data, thereby prepares the image data file.

The bit image data is compressed to prepare the image data file, whereby the data amount of the image data file can be lessened for shortening the data transfer time. Here, a compression method, such as JPEG (Joint Photographic Experts Group) or GIF (Graphics Interchange Format), can be used.

According to the third aspect of the present invention, the storage control unit 4 and the reprint unit 7 can be configured such that the storage control unit 4 determines whether or not secret specification is set in the print data and stores the print data in the storage unit 3 as a file in association with secret release information if the secret specification is set, and if print of the file with the secret specification is requested by the print request, the reprint unit 7 determines whether or not entered secret release information matches the secret release information stored in the storage unit 3 and if they match, reads the file stored in the storage unit 3 and causes the print unit 2 to print the file.

By setting the secret specification, the print right (access right) can be managed and only specific persons who are previously enabled to print (access) the file may be able to reprint the file. The expression "secret release information" is used to mean information required to release the secret specification; specifically it corresponds to authentication information such as a password, a personal identification number. The reprint unit 7 can be configured that, for example, it requests finding a secret release information matching at the time of requesting for transferring the image data file as well as at the time of that for reprinting, and enables to transfer the image data file only if a secret release information match is found.

According to the fourth aspect of the present invention, the attribute information transfer unit 5A can also transfer the attribute information in a listing format and the image data file transfer unit 5B can also transfer the image data file in a listing format.

The expression "listing format" is used to mean a format in which the contents of a number of information pieces are listed so as to be overlooked. The attribute information or the image data file is transferred in the listing format, so that the user can find out a desired file promptly. For example, when the attribute information transfer unit 5A and the image data file transfer unit 5B are grasped as information transfer unit 5, if the information transfer unit 5 is configured as a WWW (World Wide Web) server, information can be easily transferred in the listing format. That is, the attribute information and the image data file are formed as HTML (Hyper Text Makeup Language) documents, whereby they can be easily checked with a WWW browser.

According to the fifth aspect of the present invention, there is provided a printing method of storing input print data in the storage unit and causing the print unit to print the print data in response to a print request, the printing method comprising the steps of receiving the print data, determining whether or not storage specification is set in the print data, storing the print data in the storage unit as a file if the storage specification is set, determining whether or not an attribute information transfer request is issued, collecting attribute information of the file stored in the storage unit if an attribute information transfer request is received, transferring the collected attribute information to the source issuing the attribute information transfer request, selecting a file whose contents are to be displayed based on the transferred attribute information, issuing an image data file transfer request for making a request for transferring an image data file of the selected file, determining whether or not the image data file transfer request is issued, reading the file stored in the storage unit if the image data file transfer request is issued, converting the read file into an image data file, transferring the image data file to the source issuing the image data file transfer request, selecting a file to be printed based on the transferred image data file, issuing a request for printing the selected file, determining whether or not a print request is issued, reading the file stored in the storage unit if the print request is received, and causing the print unit to print the read file.

Thus, the function similar to that of the first aspect of the present invention can be provided.

According to sixth aspect of the present invention, the file converting step can convert the file stored in the storage unit into bit image data and compress the bit image data, thereby preparing the image data file.

Thus, the function similar to that of the second aspect of the present invention can be provided.

According to the seventh aspect of the present invention, the printing method can further comprise the steps of determining whether or not secret specification is set in the received print data, storing secret release information in the storage unit in association with the file if the secret specification is set, determining whether or not print of the file with the secret specification is requested if a print request for the file with the secret specification is received, determining whether or not entered secret release information matches the secret release information stored in the storage unit if print of the file with the secret specification is requested, and if they match, enabling read of the file requested to be printed from the storage unit.

Thus, the function similar to that of the third aspect of the present invention can be provided.

According to the eighth aspect of the present invention, the attribute information transferring step can transfer the attribute information in a listing format and the image data file transferring step can transfer the image data file in the listing format.

Thus, the function similar to that of the fourth aspect of the present invention can be provided.

According to the ninth aspect of the present invention, there is provided a printing system comprising a print data preparation unit 10 for preparing print data and a printing apparatus 1 for printing on a print recording medium by driving a print unit 2 based on the print data input from the print data preparation unit 10 and storing the print data in a storage unit 3, characterized in that the printing apparatus 1 comprises a storage control unit 4 for determining whether or not storage specification is set in the print data and storing the print data in the storage unit 3 as a file if the storage specification is set, an attribute information transfer unit 5A being responsive to an attribute information transfer request input from the print data preparation unit 10 for transferring attribute information of the file stored in the storage unit 3 to the print data preparation unit 10, file conversion unit being responsive to an image data file transfer request input from the print data preparation unit 10 based on the attribute information for converting the file stored in the storage unit 3 into an image data file, an image data file transfer unit 5B for transferring the image data file to the print data preparation unit 10, and a reprint unit 7 being responsive to an input print request for reading the file stored in the storage unit 3 and causing the print unit 2 to print the file, and that the print data preparation unit 10 comprises a print data preparation main unit 11 for preparing the print data based on input data, and a read unit 12 for inputting the attribute information transfer request, the image data transfer request, and the print request to the printing apparatus 1.

For example, the "print data preparation unit 10" corresponds to a host computer, such as a personal computer or a personal digital assistants (PDA). For example, the "print data preparation main unit 11" corresponds to a printer driver, etc. Storage specification is set in print data prepared by the print data preparation main unit 11 as required. If storage specification is set in print data, the print data is stored in the storage unit 3.

To reprint a file, first an attribute information transfer request is issued from the read unit (12A) and the attribute information transfer unit 5A transfers the attribute information of the stored files to the read unit 12 in response to the attribute information transfer request. Next, when the user selects the files to be displayed based on the transferred attribute information (12B), an image data file transfer request is issued to display the selected files (12C). The image data file transfer unit 5B transfers the requested image data file to the read unit 12 in response to the image data file transfer request. The image data file is displayed, so that the user can select the file to be reprinted (12D). When the printing apparatus 1 is requested to print the selected file (12E), the reprint unit 7 reads the file from the storage unit 3 and causes the print unit 2 to print the file.

According to the tenth aspect of the present invention, the file conversion unit 6 may convert the file stored in the storage unit 3 into bit image data and compress the bit image data, thereby preparing the image data file.

Thus, the function similar to that of the second aspect of the present invention can be provided.

According to the eleventh aspect of the present invention, the storage control unit 4 can determine whether or not secret specification is set in the print data and store the print data in the storage unit 3 as a file in association with secret release information if the secret specification is set, and if print of the file with the secret specification is specified in the print request, the reprint unit 7 can determine whether or not secret release information entered through the read unit 12 matches the secret release information stored in the storage unit 3 and if they match, can read the file stored in the storage unit 3 and cause the print unit 2 to print the file.

Thus, the function similar to that of the third aspect of the present invention can be provided.

According to the twelfth aspect of the present invention, the attribute information transfer unit can also transfer the attribute information in the listing format and the image data file transfer unit can also transfer the image data file in the listing format.

More specifically, for example, the information transfer unit 5 of the printing apparatus 1 is configured as a WWW server and the read unit 12 is configured as a WWW browser, whereby the attribute information of the files stored in the storage unit 3 can be listed on a monitor and the image data of the files can also be listed on the monitor.

According to the thirteenth aspect of the present invention, there is provided a printing system comprising an image data input unit 21 for inputting image data, a printing apparatus 1 for printing on a print recording medium by driving a print unit 2 based on the print data input from the image data input unit 21 and storing the image data in a storage unit 3 as a file, and a read unit 12 for reading the contents of the image data stored in the storage unit 3 and issuing a print request to the printing apparatus 1, characterized in that the printing apparatus 1 comprises an attribute information transfer unit 5A being responsive to an attribute information transfer request from the read unit 12 for transferring attribute information of the file stored in the storage unit 3 to the read unit 12, an image data file transfer unit 5B being responsive to an image data file transfer request input from the read unit 12 based on the attribute information for transferring the file stored in the storage unit 3 to the read unit 12, and a reprint unit 7 being responsive to a print request input from the read unit 12 for reading the file stored in the storage unit 3 and causing the print unit 2 to print the file.

The expression "image data input unit 21" is used to mean a unit that can input image data to the printing apparatus 1, such as a scanner, a film scanner, a digital still-video camera, or a digital video camera. The image data input unit 21 is connected to the printing apparatus 1 through an interface for inputting image data to the printing apparatus 1. It may be installed in the printing apparatus 1 as a printing apparatus with a scanner, a complex machine of a copier and a facsimile, or the like, for example. Image data can also be input to the printing apparatus 1 with a memory card storing the image data.

Image data is input from the image data input unit 21 to the printing apparatus 1 and is stored therein, whereby it can be reprinted by the read unit 12.

BRIEF DESCRIPTION OF THE DRAWINGS

In the accompanying drawings:

FIG. 15 is a schematic representation to show an attribute information listing screen according to a modified example of the present invention;

FIG. 17 is a schematic representation to show a print job progress state of a conventional printing system.

DETAILED DESCRIPTION OF THE PREFERRED EMBODIMENTS

Referring now to the accompanying drawings, there are shown preferred embodiments of the present invention.

1. First Embodiment

Figure 2:
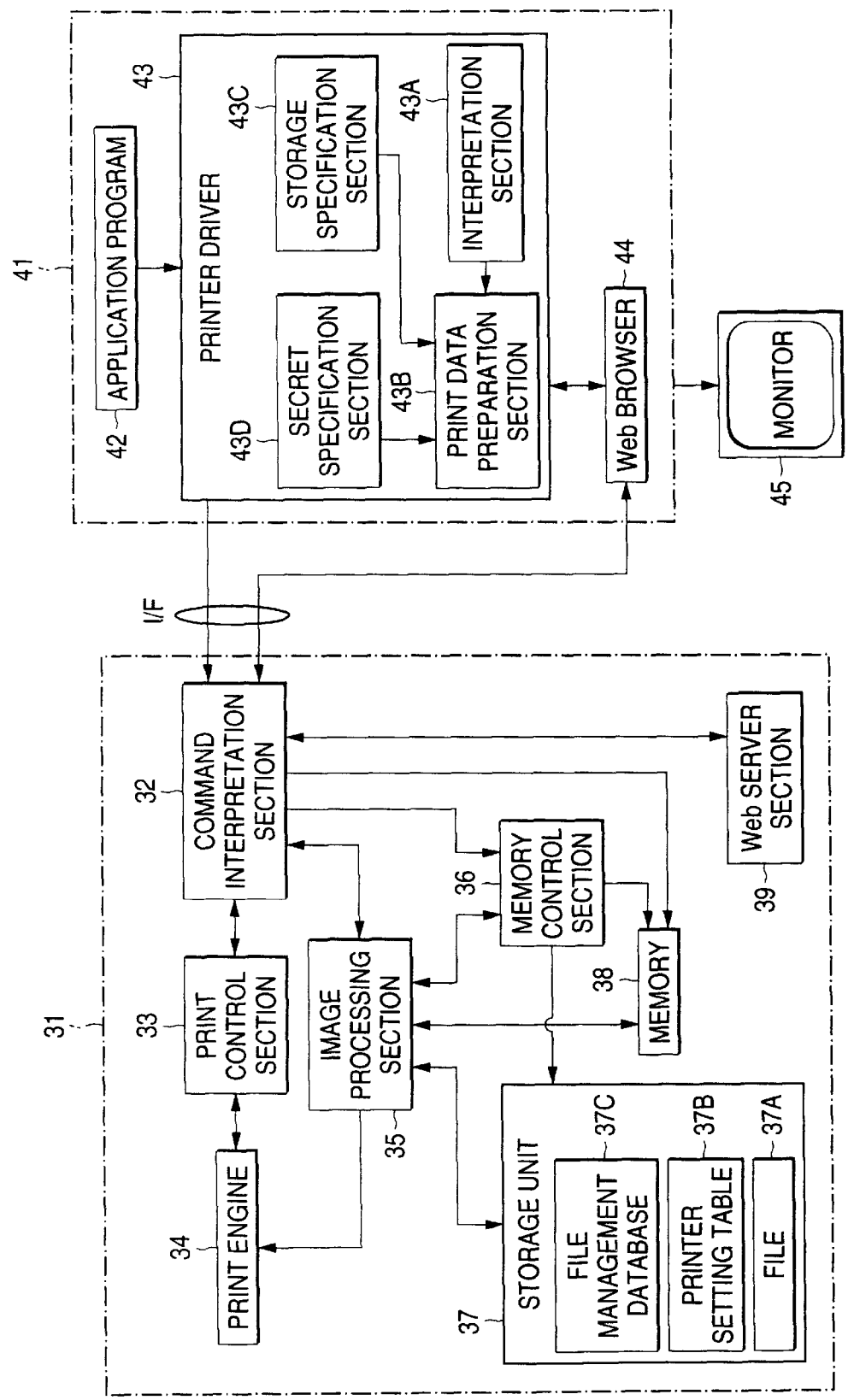
FIG. 2 is a block diagram of a printing system, etc., according to the first embodiment of the present invention.

FIGS. 2–11 relate to a first embodiment of the present invention. FIG. 2 is a block diagram to show the configuration of a printing system according to the first embodiment.

1—1 Functional Configuration of Printer

A printer 31 as "printing apparatus" according to the embodiment comprises a command interpretation section 32, a print control section 33, a print engine 34, an image processing section 35, a memory control section 36, a storage unit 37, a memory 38, and a web server section 39 as respectively described later.

The command interpretation section 32 interprets input print data and executes predetermined control operation. For example, when print data is input, the command interpretation section 32 interprets the print data and controls the memory control section 36, thereby storing the print data in the memory 38 such as a DRAM (dynamic random access memory). If storage specification is set in the print data, the command interpretation section 32 controls the memory control section 36, thereby storing the print data in the storage unit 37. If secret specification is set in the print data, the command interpretation section 32 relates secret release information contained in the input data to the print data file and stores them in the storage unit 37. If an information transfer request is received from a host computer 41 as described later, the command interpretation section 32 controls the memory control section 36, thereby collecting necessary information from the storage unit 37, and sends the collected information to the web server 39.

The print control section 33 controls the operation of the print engine 34. That is, the print control section 33 controls the paper feed operation, the transfer operation, or any other operation of the print engine 34. The print engine 34 prints on a print recording medium. The specific configuration of the print engine 34 has a specific configuration varying depending on the adopted printing technique, and is not the gist of the present invention and thus any printing technique such as laser, ink jet, or thermal transfer can be adopted.

The image processing section 35 executes image processing such as converting print data into bit image data required for printing. For example, if print data is input and a print job occurs, the image processing section 35 reads the print data stored in the memory 38, converts the print data into bit image data, and transfers the bit image data to the print engine 34, which then executes desired printing based on the bit image data. If an image data file transfer request is received from the host computer 41 as described later, the image processing section 35 reads the file stored in the storage unit 37, converts the file into bit image data, and converts the bit image data into a compressed file format such as JPEG (Joint Photographic Experts Group).

The memory control section 36 controls data write into the memory 38 and the storage unit 37, data read, etc. For example, the memory control section 36 writes input print data into the memory 38 and reads the print data stored in the memory 38 and transfers the print data to the storage unit 37 in response to a control instruction of the command interpretation section 32.

The storage unit 37 stores a plurality of print data pieces; specifically, a hard disk drive, a flash memory, a magneto-optic disk drive, etc., can be used, for example. The storage unit 37 stores print data files 37A with storage specification, a printer setting table 37B, and a file management database 37C.

Figure 3:
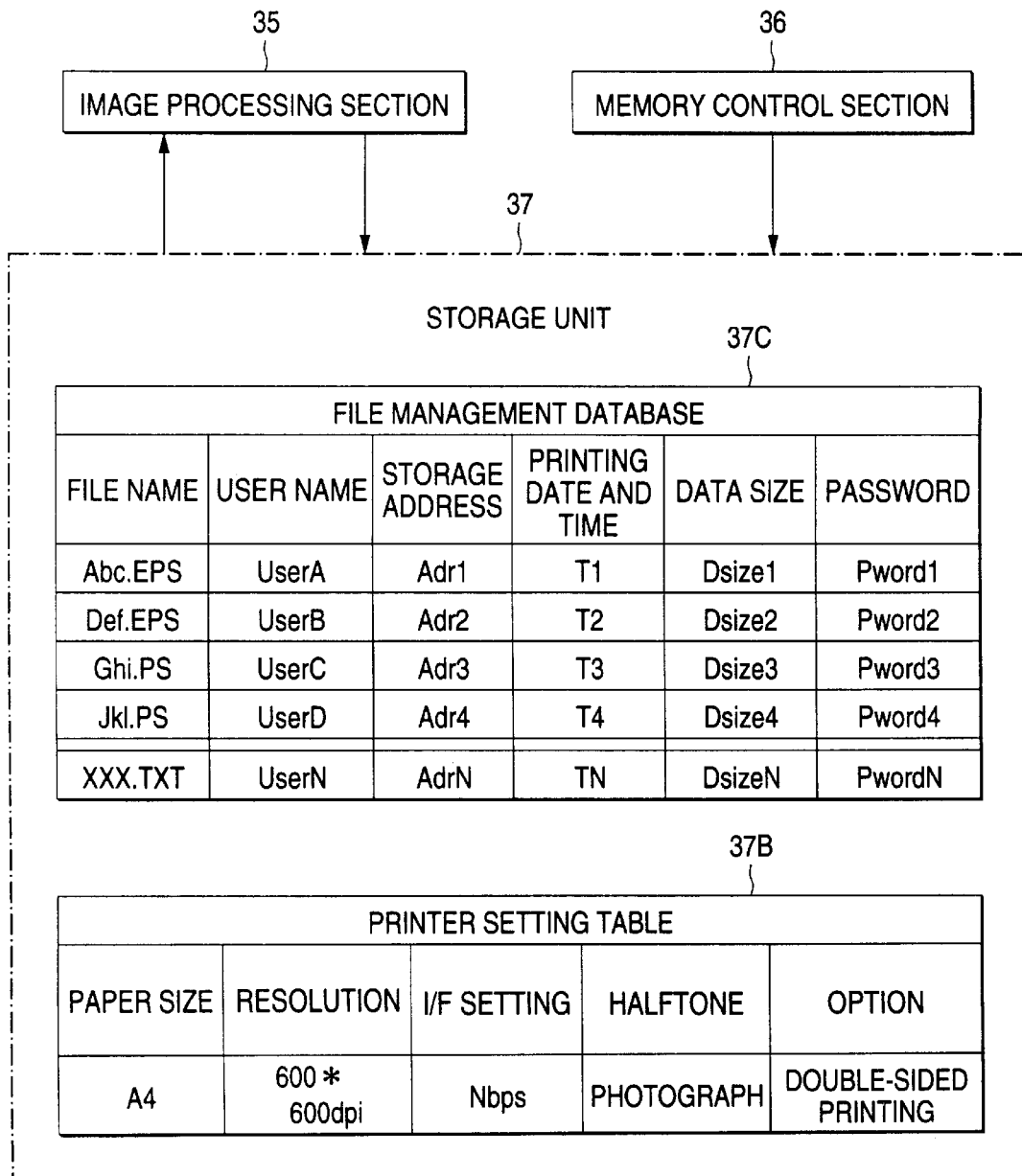
FIG. 3 is a schematic representation to show the formats of a file management database and a printer setting table formed in a storage unit.

As shown in FIG. 3, a schematic representation, the printer setting table 37B stores settings of the printer 31 including supplied paper size, resolution, interface (I/F) setting, halftone setting, option information, etc. The file management database 37C associatively stores bibliographical information belonging to the files stored in the storage unit 37, namely, attribute information, such as file names, user names, storage addresses, printing date and time, data size, and passwords. The file management database 37C is searched by a search engine (not shown), whereby the attribute information of any stored file can be read. The printer setting table 37B may be stored in any other memory such as an EEPROM (electrically erasable and programmable read only memory) or a flash ROM (read-only memory).

Figure 1:
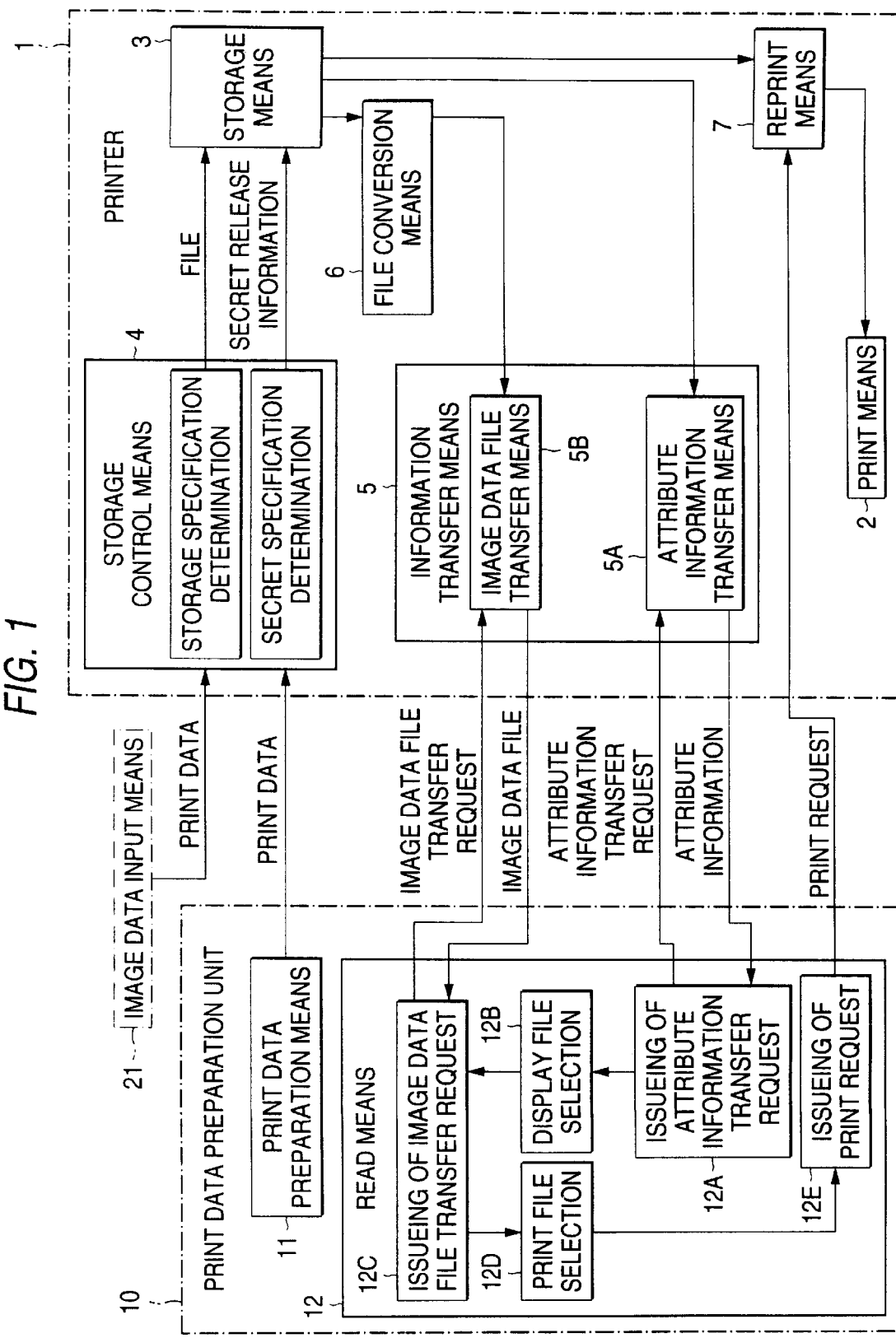
FIG. 1 is a functional block diagram to explain the functional configuration of the present invention.

The web server section 39 provides a WWW (world wide web) server function and corresponds to information transfer unit 5 in FIG. 1. That is, the web server section 39 prepares an HTML format file based on the information in the printer 31. Therefore, the HTML file in the web server section 39 can be read from the outside using a web browser 44.

For example, the web server section 39 prepares an attribute information list file in the HTML format based on the attribute information of the stored files sent from the command interpretation section 32 and transfers the attribute information list file to the host computer 41. The web server section 39 also prepares an image data list file in the HTML format based on the image data of the stored files sent from the command interpretation section 32 and transfers the image data list file to the host computer 41.

1–2 Functional Configuration of Host Computer

The host computer 41 corresponding to "print data preparation unit 10" in FIG. 1 comprises an application program 42, a printer driver 43, and a web browser 44 as respectively described later. A monitor 45 that can be represented as a display unit is connected to the host computer 41. The host computer 41 and the printer 31 are connected through a multivendor protocol, such as TCP/IP (Transmission Control Protocol/Internet Protocol) or HTTP (Hyper Text Transfer Protocol).

The application program 42 is a program for preparing data to be printed, such as a document preparation program or a drawing program.

The printer driver 43, which corresponds to "print data preparation unit 10" in FIG. 1, causes the printer 31 to execute a print job and has an interpretation section 43A, a print data preparation section 43B, a storage specification section 43C, and a secret specification section 43D. The print data prepared with the application program 42 is interpreted by the interpretation section 43A and is converted by the print data preparation section 43B into print data that can be interpreted by the printer 31. The storage specification section 43C sets storage specification in the print data provided by the print data preparation section 43B. The secret specification section 43D sets secret specification in the print data.

If the user wants to store print data, a function code indicating that storage specification is set is added to the print data. If the user wants print data to be handled as secret data, a function code indicating that secret specification is set is added to the print data and a password as "secret release information" required to release the secret specification is also added to the print data. As shown in FIG. 3, the password is stored in the file management database 37C in association with the file name, etc., of the print data file.

The web browser 44 is provided for reading and retrieving the HTML format file in the web server section 39. That is, the web browser 44 allows the user to specify the HTML format file in the web server section 39 by a URL (Uniform Resource Locator), such as "http://server name/directory name/file name," for reading the HTML format file. The HTML format files read through the web browser 44 include an attribute information list file indicating the attribute information of the files stored in the storage unit 37, an image data list file indicating the image data of selected files, and a printer setting list file indicating the contents of the printer setting table 37B. The web browser 44 can request the printer 31 to print a selected file based on the image data list file.

1–3 Processing Contents

Next, control processing of the printing system according to the embodiment will be discussed with reference to FIGS. 4–11.

Figure 4:
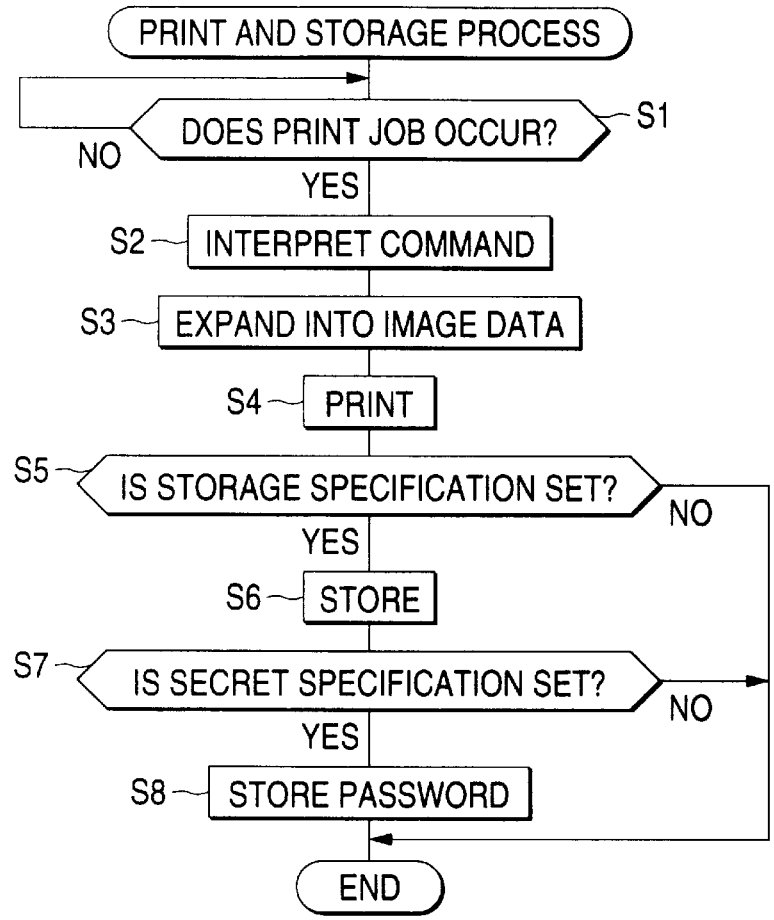
FIG. 4 is a flowchart to show a print and storage process.

First, FIG. 4 is a flowchart to show a print and storage process for causing the printer 31 to execute a print job and store necessary print data in the storage unit of the printer 31.

At step S1, whether or not print data is input from the printer driver 43 of the host computer 41 and a print job occurs is checked. If a print job occurs, the input print data is interpreted at step S2 and is expanded into image data required for printing by the image processing section 35 at step S3. The image data is transferred from the image processing section 35 to the print engine 34, which then prints the image data on a print recording medium at step S4.

Next, whether or not storage specification is set in the input print data is determined at step S5. If storage specification is set, the print data is stored in the storage unit 37 as a file at step S6. The attribute information concerning the stored file is added to the file management database 37C.

Further, whether or not secret specification is set in the stored file is determined at step S7. If secret specification is set, a password required for releasing the secret specification is stored in the file management database 37C and the process is terminated. If storage specification is not set in the file, steps S6–S8 are skipped, the data is discarded, and the process is terminated. If secret specification is not set in the stored file, step S8 is skipped and the process is terminated.

Thus, when print data is input from the host computer 41, the data is interpreted and printed. If storage specification is set, the print data is stored in the storage unit 37. As shown in FIG. 4, first the printing takes precedence, next the file is stored, so that the printing time can be shortened.

Figure 5:
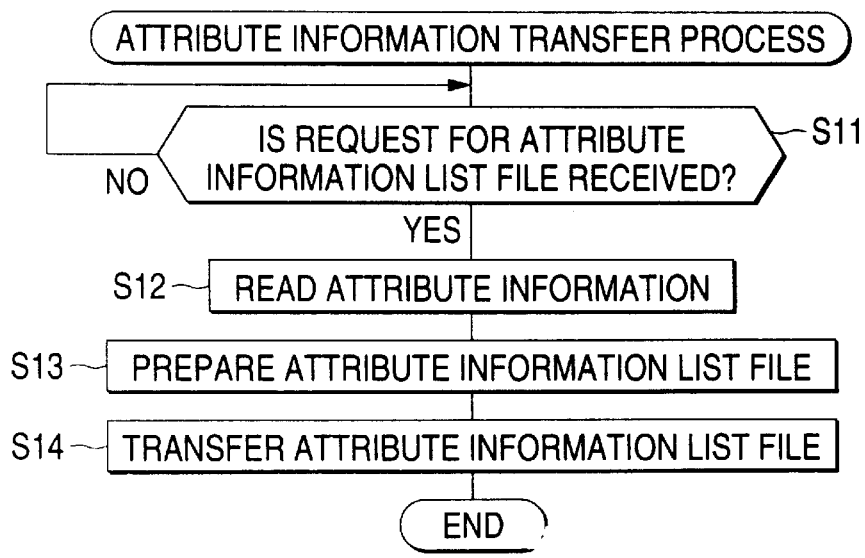
FIG. 5 is a flowchart to show an attribute information transfer process.

FIG. 5 is a flowchart to show an attribute information transfer process for transferring attribute information of stored files from the printer 31 to the host computer 41.

At step S11, whether or not a request for transferring an attribute information list file is received from the web browser 44 of the host computer 41 is checked.

If the reprint is required, the user specifies a URL, such as "http://IP address of printer 31/attribute information list file name," through the web browser 44 for making a request for transferring the attribute information list file.

When the transfer request of the attribute information list file occurs, the command interpretation section 32 controls the memory control section 36 to read the file management database 37C in the storage unit 37 at step S12, and sends the attribute information of the read stored file to the web server section 39.

The web server section 39 prepares an attribute information list file in the HTML format based on the attribute information sent from the command interpretation section 32 at step S13 and transfers the attribute information list file to the web browser 44 at step S14, whereby the user can read the attribute information list file displayed on the monitor 45 and check the file names, the user names, etc., of the files stored in the storage unit 37.

Figure 6:
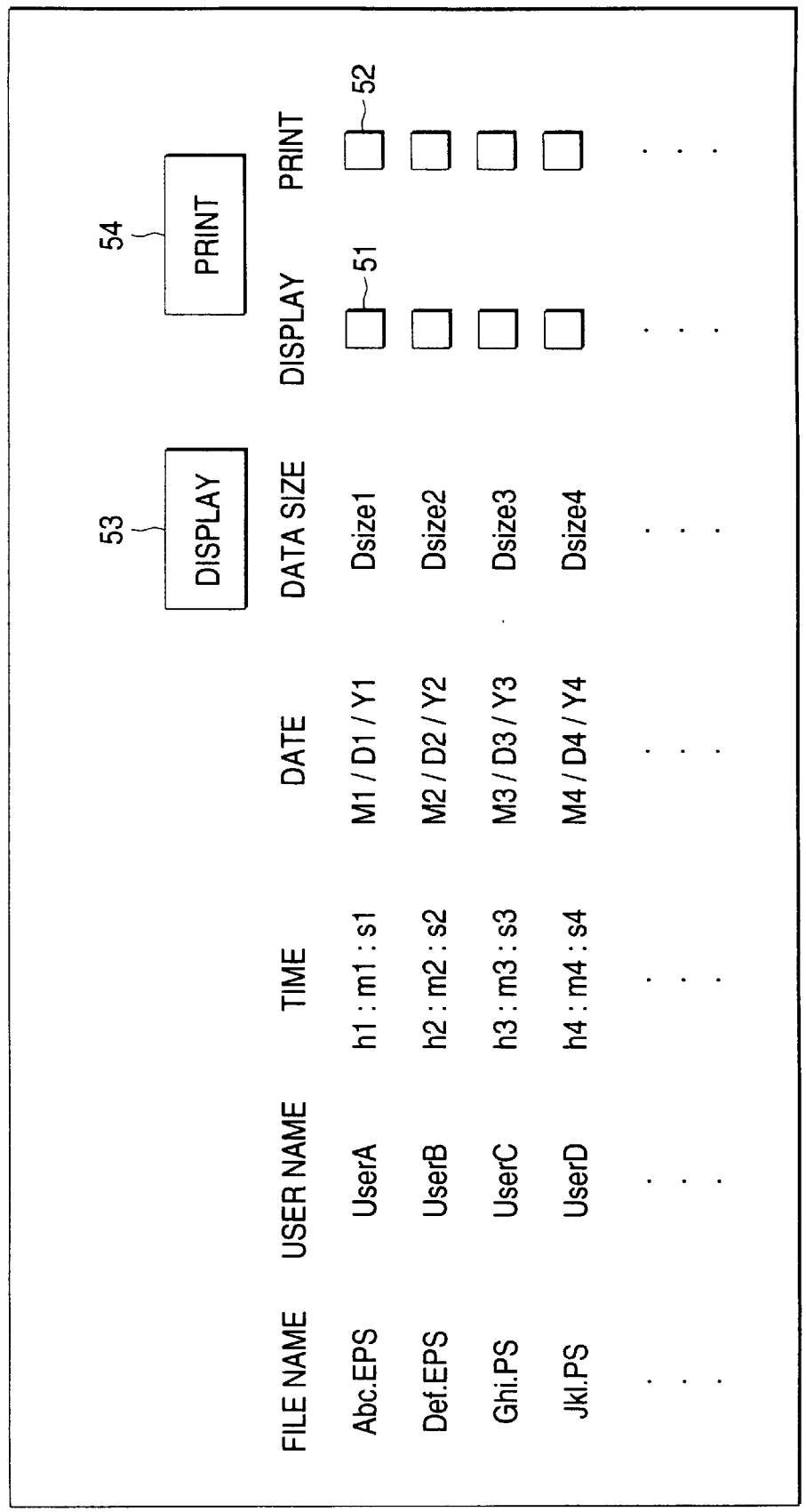
FIG. 6 is a schematic representation to show an attribute information listing screen.

FIG. 6 is a schematic representation to show the displayed contents of the attribute information list file. As shown here, the file names, the user names, the printing dates and time, and the data sizes are listed as the attribute information of the stored files. A display check box 51 and a print check box 52 are provided for each file to the side of the data size and a display button 53 and a print button 54 are placed above the check boxes 51 and 52. The user, who wants to display or print a file, checks the display or print check box corresponding to the file through a pointing device such as a mouse, then operates the display button 53 or the print button 54, whereby the desired file can be displayed or printed.

In FIG. 6, "h:m:s" denotes "hours:minutes:seconds" and "M1:D1:Y1" denotes "months:days:years."

Figure 7:
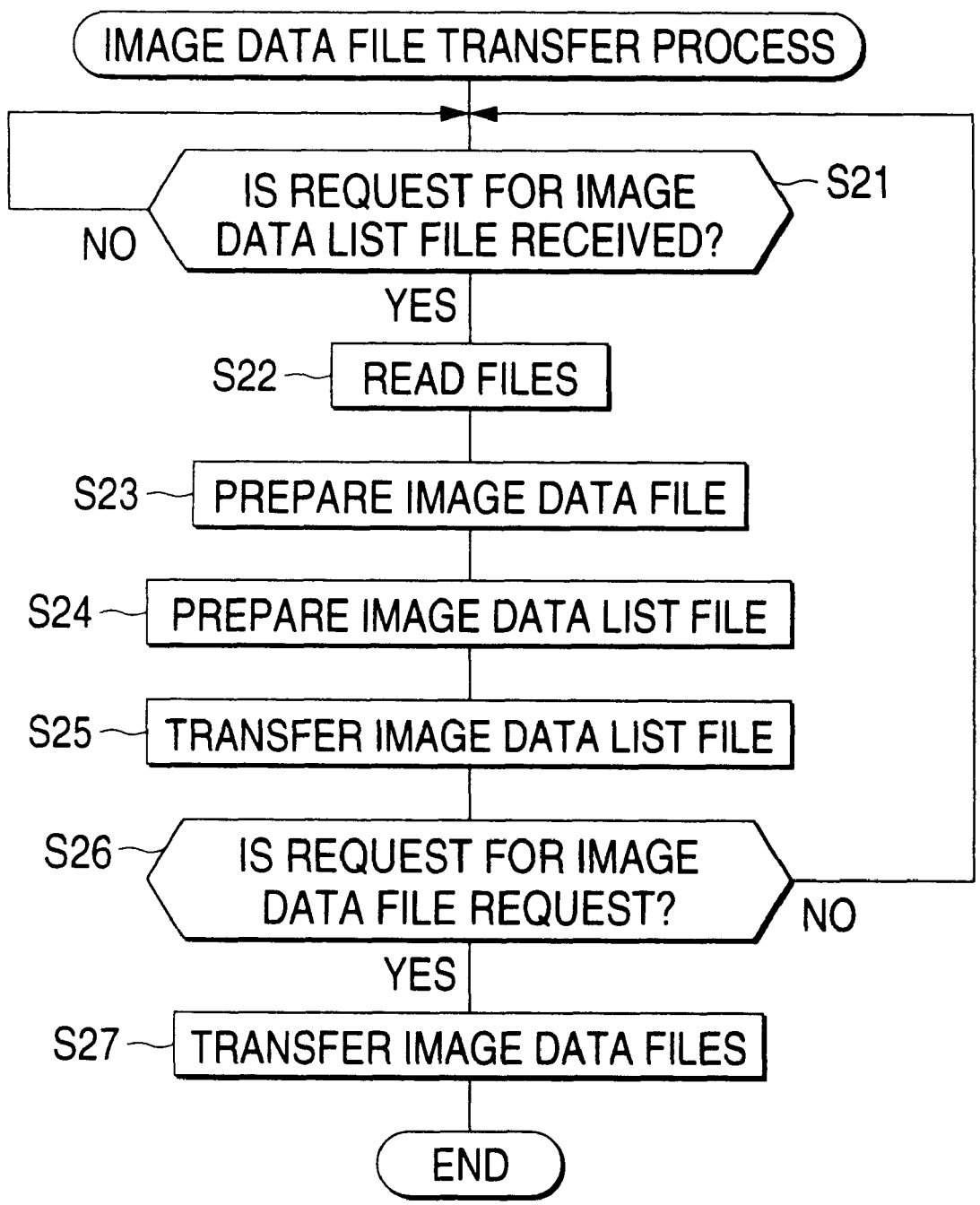
FIG. 7 is a flowchart to show an image data file transfer process.

FIG. 7 is a flowchart to show an image data file transfer process for transferring image data of stored files from the printer 31 to the host computer 41.

Figure 8:
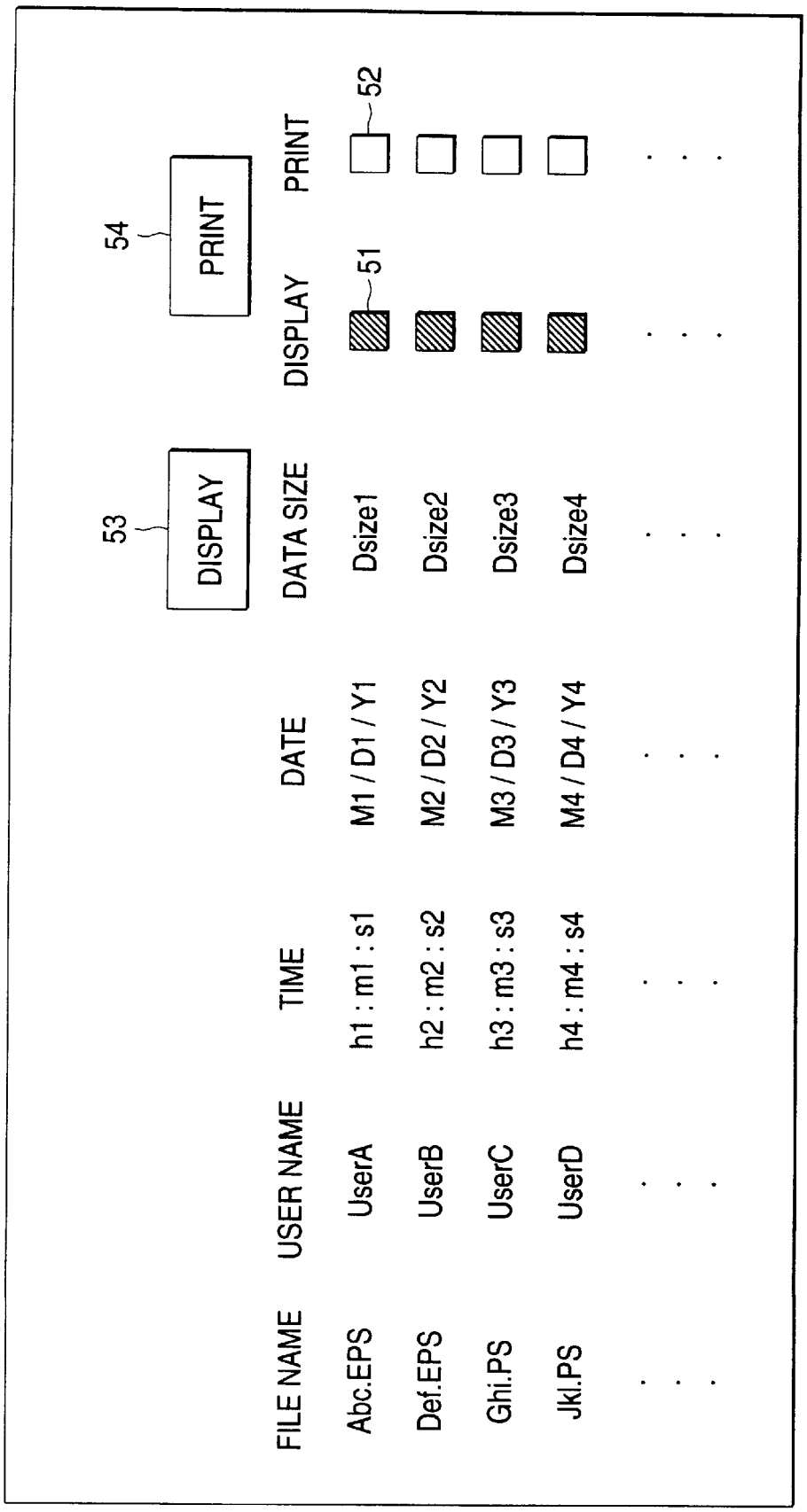
FIG. 8 is a schematic representation to show how to select files to be displayed.

At step S21, whether or not a transfer request of an image data list file is received from the web browser 44 is checked. The user reads the image data list file and narrows down the files to be reprinted, then selects display of several candidate files based on the attribute information of the file names, etc., as shown in FIG. 8, by checking the display check boxes 51 of the candidate files and operating the display button 53 for selecting the displayed files.

If the user selects display of several files, the web browser 44 requests the printer 31 to transfer an image data list file, for example. This transfer request for image data list file is prepared as an HTML format file.

When the transfer request of image data list file is issued from the web browser 44, the image processing section 35 reads the selected files from the storage unit 37 at step S22. Next, the image processing section 35 expands the read files into bit image data, then compresses the bit image data and prepares compressed image data files according to JPEG, GIF (Graphics Interchange Format), etc., at step S23.

Figure 9:
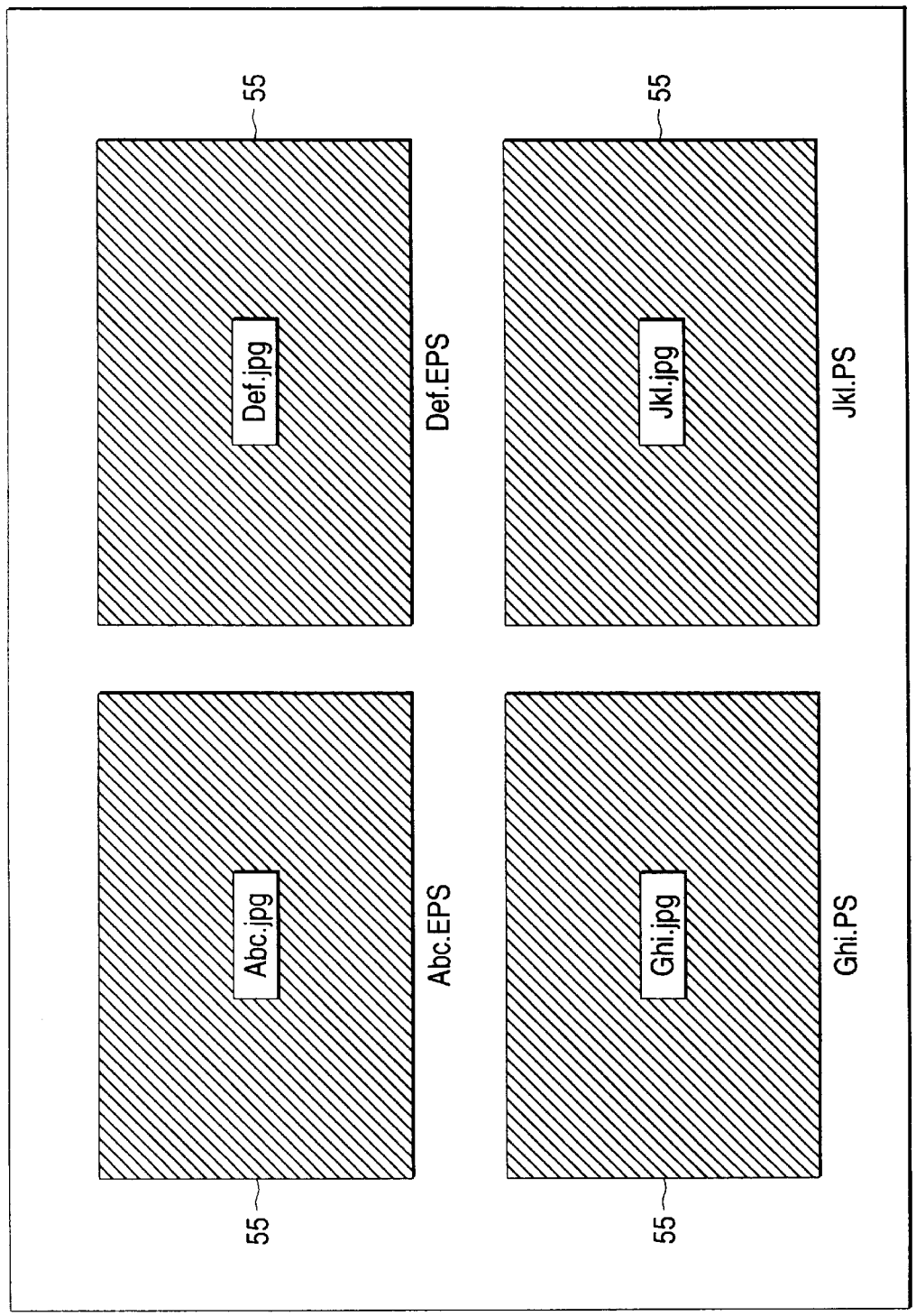
FIG. 9 is a schematic representation to show a listing screen of images of selected files.

The compressed image data files together with original file names (file names of print jobs) are sent through the command interpretation section 32 to the web server section 39, which then an image data list file as shown in FIG. 9 is prepared as an HTML format file at step S24.

Assuming that the file name of a file stored in the storage unit 37 is "Fname.PS," the image processing section 35 converts the file into a compressed file named "Fname.jpg" and inputs the compressed image data file "Fname.jpg" and the text data of the file name "Fname.PS", which is before compression, to the web server section 39. Then, the web server section 39 prepares an image data list file in the HTML format with the image data files and the file names of text data placed as shown in FIG. 9.

The image data list file is transferred through the I/F to the web browser 44 at step S25. The web browser 44 interprets the image data list file and displays the file on the monitor 45 as they are placed as shown in FIG. 9. That is, the web browser 44 displays the file names of text data at predetermined positions and requests the web server section 39 to transfer the compressed image data files linked with the file names. When receiving the transfer request of compressed image data file from the web browser 44 at step S26, the web server section 39 returns the compressed image data files to the web browser 44 at step S27. Then, the web browser 44 lists print images 55 of the files in correspondence with the file names on the monitor, whereby the user can check the print images of several selected candidate files and specify any desired file.

Figure 10:
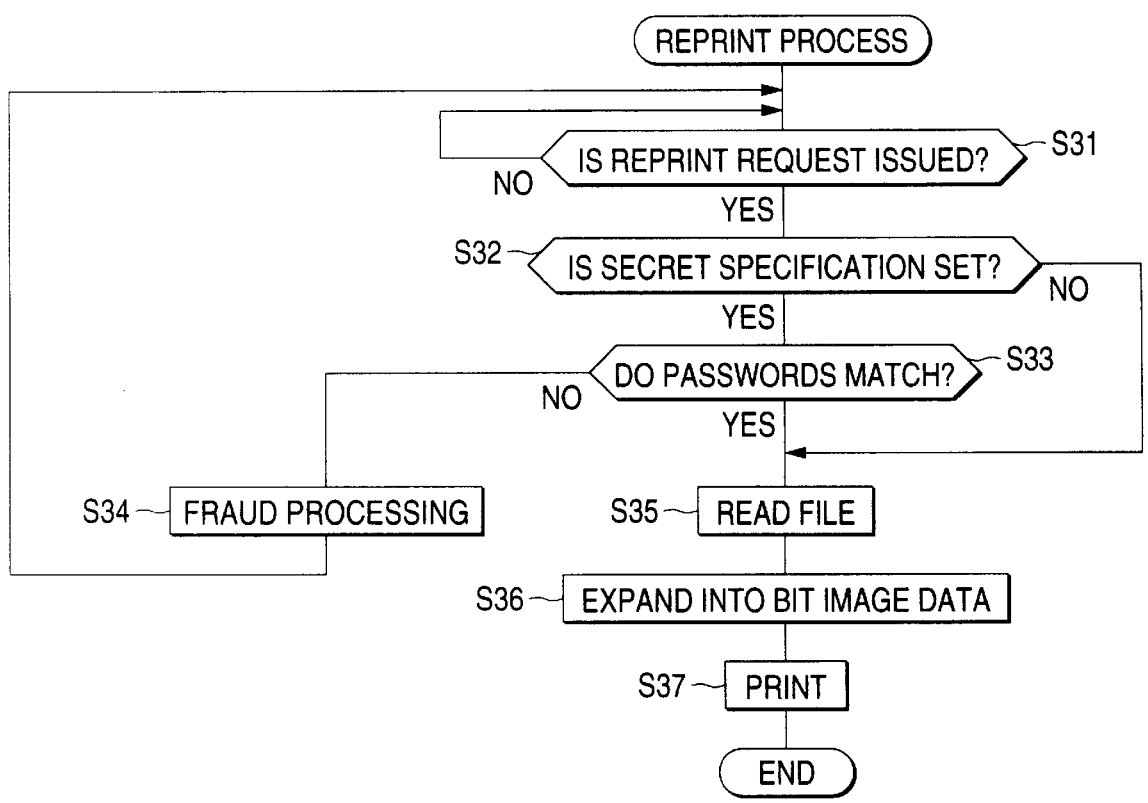
FIG. 10 is a flowchart to show a reprint process.

FIG. 10 is a flowchart to show a reprint process for printing a file stored in the storage unit 37.

Figure 11:
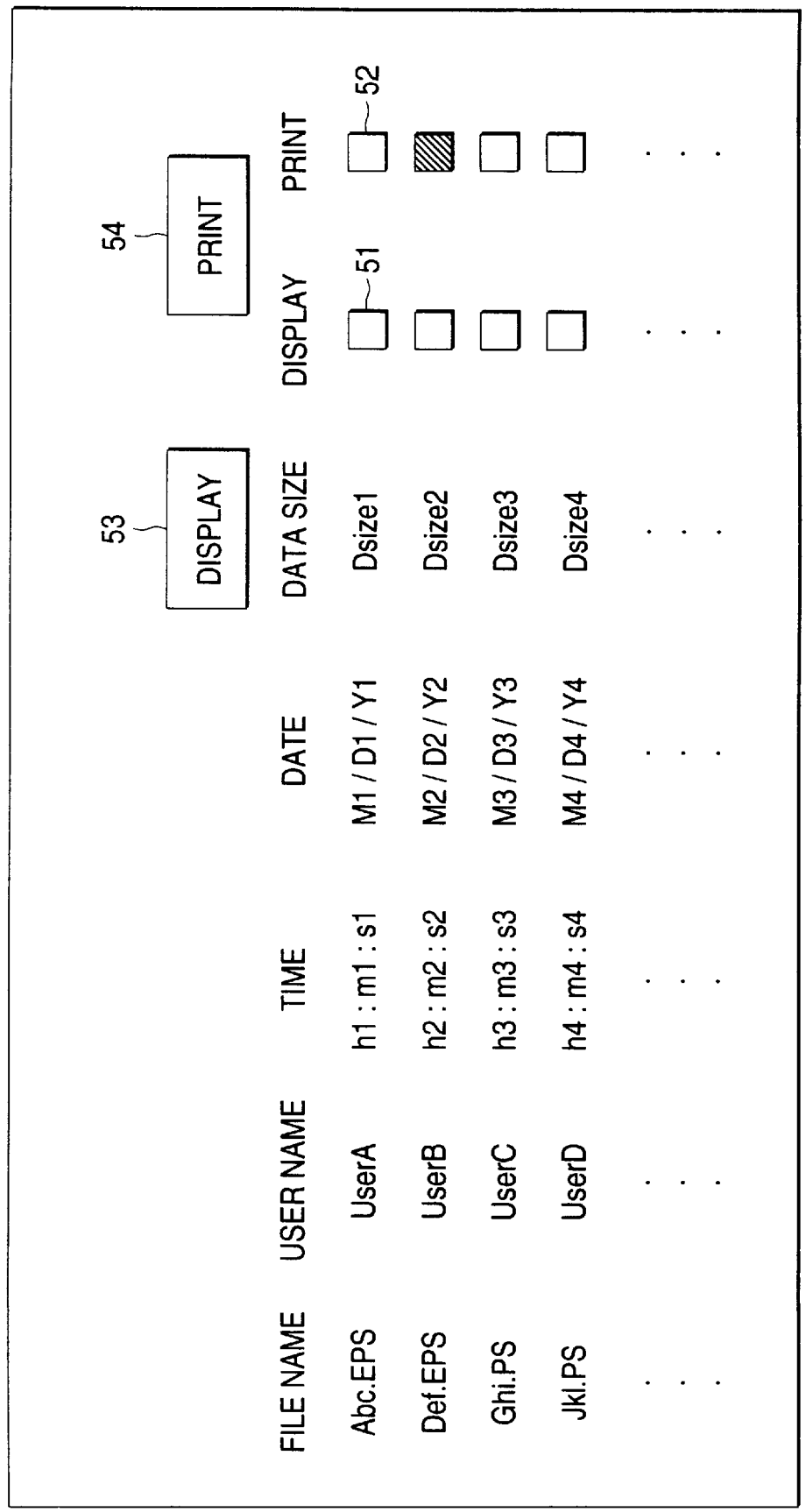
FIG. 11 is a schematic representation to show how to specify reprint.

First, at step S31, whether or not a print request is issued from the host computer 41 is determined. The user can accurately specify any desired file by reading the image data list file. If the user finds the desired file, he or she checks the print check box 52 corresponding to the file with the pointing device, etc., as shown in FIG. 11, and operates the print box 54.

Thus, a request for printing the selected file is issued through the I/F to the printer 31. When the print request is input to the printer 31, the file management database 37C in the storage unit 37 is referenced and whether or not secret specification is set in the file requested to be printed is determined at step S32. If secret specification is set in the file, a request for entering a password is returned to the web browser 44. If the user enters a password in response to the password entry request, the entered password is compared with the password corresponding to the file, stored in the file management database 37C at step S33.

If the entered password does not match the password previously registered in the file management database 37C, a fraud process is executed, for example, by returning a message to the effect that the entered password does not match the registered password to the web browser 44 at step S34. The print request may be issued together with the password. That is, an HTML format file is prepared in response to the password and the print request and can be transferred to the printer 31.

If the entered password matches the password registered in the file management database 37C, the file is read from the storage unit 37 based on the file storage address stored in the file management database 37C at step S35. The read file is expanded into bit image data by the image processing section 35 at step S36 and the bit image data is transferred to the print engine 34, which then prints the contents of the file requested to be printed on a print recording medium at step S37.

The embodiment thus configured produces the following effects:

First, the attribute information of the files stored in the storage unit 37 is first transferred from the printer 31 to the host computer 41, next a request for transferring the image data files of the files selected by the user of the host computer 41 based on the attribute information is sent to the printer 31, so that the user can check the print images of the stored files before specifying reprint. Therefore, the user can accurately specify a desired file for reprinting the file; fruitless, erroneous printing can be prevented for improving the printing efficiency.

Second, the candidate files are narrowed down based on the attribute information and only the image data of the candidate files is transferred, thus the response time of the printer 31 can be shortened and communication path traffic can be decreased.

For example, a request for transferring all image data files stored in the storage unit 37 can also be sent from the web browser 44 to the web server section 39. In this case, however, the image processing section 35 must expand all stored files into bit image data. Therefore, the processing load on the image processing section 35 increases and the response time until an image data list file is returned is prolonged. Since the execution time of another print job input from another host computer connected to the network is prolonged, the whole printing efficiency of the network printing system lowers.

In contrast, in the embodiment, the files to be displayed are narrowed down according to an attribute information list file and image display is prepared only for the narrowed-down files, so that erroneous printing can be prevented while the processing load on the image processing section 35, etc., is decreased.

Third, image data files are prepared by compressing files converted into bit image data, thus the transfer time of image data file can be shortened and the printing efficiency can be improved.

Fourthly, if secret specification is set in a file, reprint of the file is enabled only when the entered password of secret release information matches the password of the file, thus confidential file management can be executed and ease of use is improved. Although in the embodiment, whether or not a password matching is found is determined only at the reprint time, the password matching may be found when file display is requested, for instance.

Fifthly, an attribute information list file and an image data list file are transferred to the host computer 41, so that the user can easily check the attribute information and image data files and ease of use can be improved.

Sixthly, in the embodiment, the printer 31 is provided with the web server section 39 and the web browser 44 is installed in the host computer 41 for executing two-way communication according to the HTTP, so that ease of use is improved. That is, in the conventional system, a dedicated utility program is installed in the host computer and the attribute information stored in the printer is read by using the utility program, thus the user needs to install the dedicated utility program in the host computer and learn the utility program operation method; there is a problem in ease of use. In contrast, in the embodiment, the web server section 39 in the printer 31 and the web browser 44 in the host computer 41 enable the user to read and retrieve the attribute information and image data files, thus a special utility program need not be installed in the host computer 41 and the user can easily operate the printing system according to the highly versatile web browser 44.

2. Second Embodiment

Next, the second embodiment of the present invention will be discussed with reference to FIGS. 12 and 13. Parts identical with those previously described with reference to FIGS. 2 and 9 are denoted by the same reference numerals in FIGS. 12 and 13 and will not be discussed again. The second embodiment is characterized by the fact that the present invention is applied to a printing apparatus comprising an image data input unit.

Figure 12:
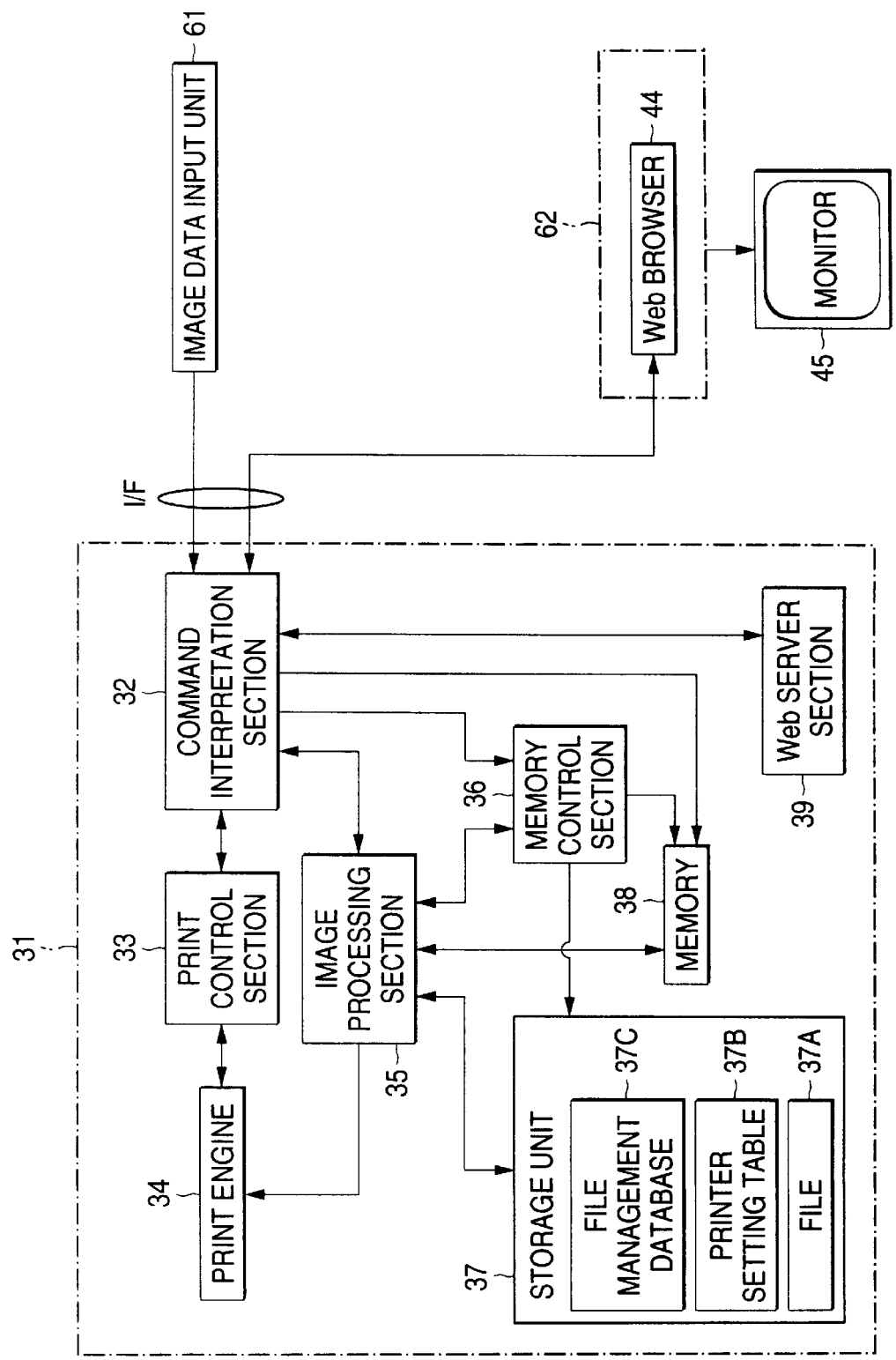
FIG. 12 is a block diagram to show a printing system according to the second embodiment of the present invention.

FIG. 12 is a block diagram of a printing system according to the second embodiment of the present invention. An image data input unit 61 as "image data input unit" is configured as a unit that can input image data, such as a scanner, a film scanner, a digital still-video camera, or a video camera.

The image data input unit 61 reads an image recorded on a paper medium, etc., through an image pick-up device such as a CCD and converts the image into bit image data. This bit image data is input through an I/F to a command interpretation section 32 and is stored in a storage unit 37. From the viewpoint of effective use of memory resources, preferably the bit image data input from the image data input unit 61 is compressed and stored in the storage unit 37.

As in the first embodiment, if the user wants to reprint a file, a request for transferring an attribute information list file is sent to a printer 31 through a web browser 44 installed in a host computer 62 and the images of candidate files selected based on the returned attribute information list file are displayed, whereby the desired file can be reprinted accurately.

Figure 13:
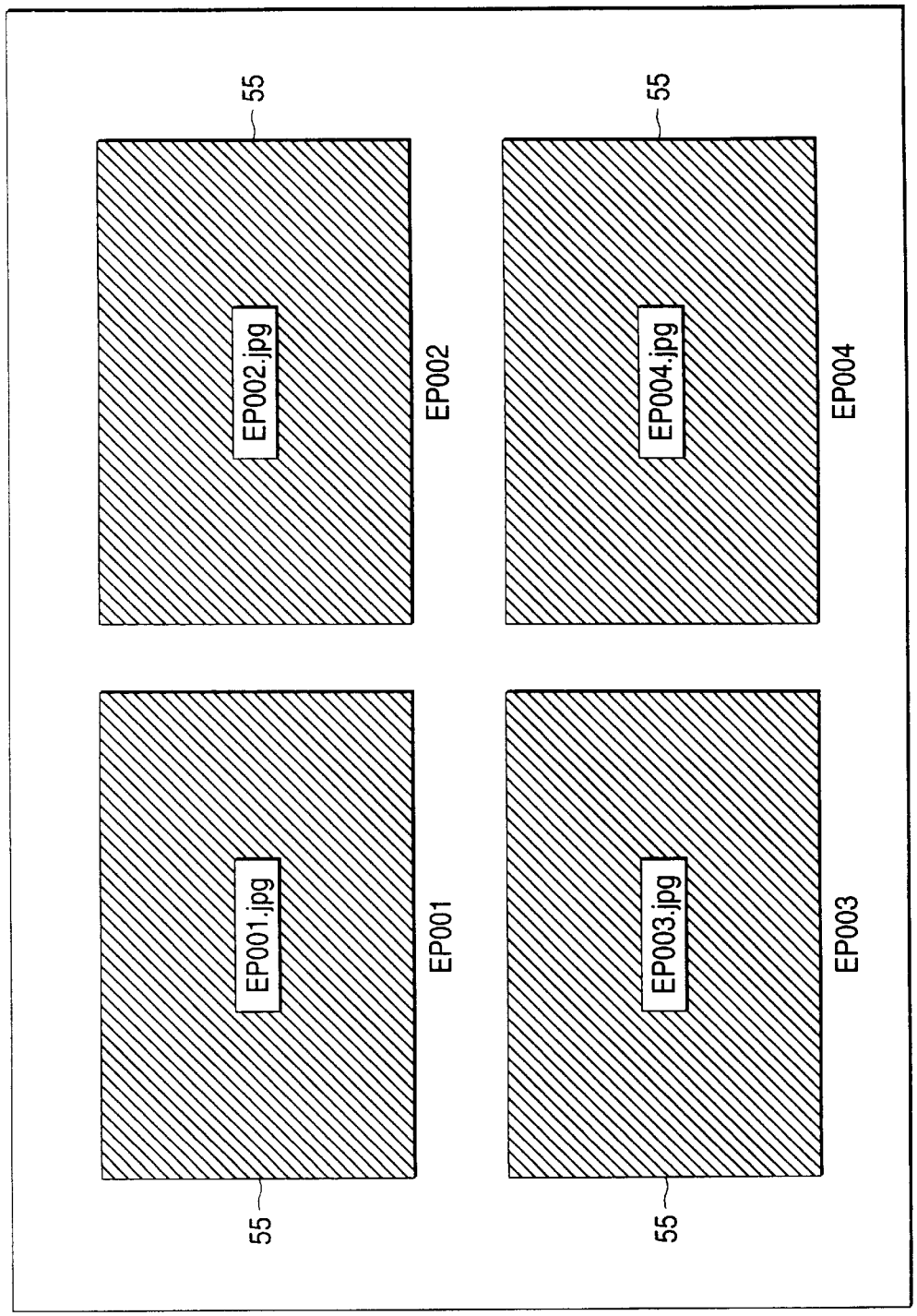
FIG. 13 is a schematic representation to show a listing screen of images of image data.

FIG. 13 is a schematic representation to show a state in which an image data list file transferred from a web server section 39 is read with the web browser 44. Since the normal image data input unit 61 uses serial numbers such as EP001 for management, it is difficult to specify a desired file based only on the serial number as a part of the attribute information. However, also in the embodiment, image data files can be listed on a monitor 45 based on link information (tags) embedded in the image data list file, so that the user can accurately specify any desired file. If the image data input unit 61 can input file names consisting of characters, the file names may be displayed as in the first embodiment.

The host computer 62 in the embodiment can also be configured as a controller of a complex machine, for instance. The complex machine is a multi-functional printer comprising a scanner function, a print function, a facsimile function, etc. For example, the image data input unit 61 is used as an image reader to read images on paper media and the read images are compressed and stored in the storage unit 37. If the read data is printed by a print engine 34, a copier function can be provided. For example, the web browser 44 is operated through a control panel of the printer 31, whereby any file stored in the storage unit 37 can be called and reprinted.

3. Third Embodiment

Next, a third embodiment of the present invention will be discussed with reference to FIG. 14. Parts identical with those previously described with reference to FIGS. 2 and 12 are denoted by the same reference numerals in FIG. 14 and will not be discussed again. The third embodiment is characterized by the fact that the first and second embodiments are combined.

Figure 14:
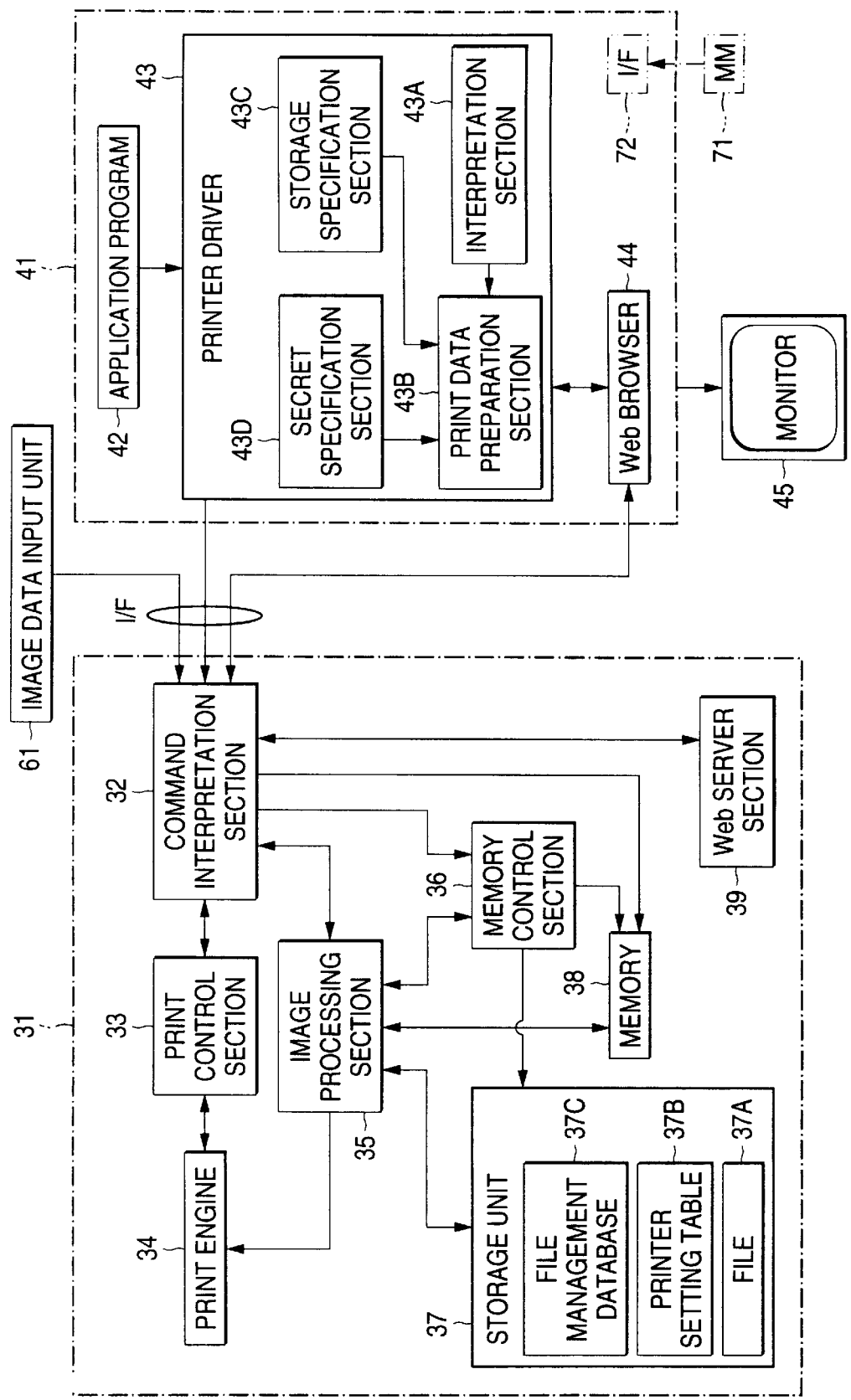
FIG. 14 is a block diagram to show a printing system, etc., according to the third embodiment of the present invention.

As shown in FIG. 14, a block diagram, a host computer 41 and an image data input unit 61 are connected to a printer 31 through an I/F. Therefore, print data can be input to the printer 31 through the host computer 41 and image data can also be input to the printer 31 through the image data input unit 61.

The image or print data input from the host computer 41 or the image data input unit 61 is stored in a storage unit 37. As described in the first embodiment, the data stored in the storage unit 37 is read and retrieved through a web browser 44, whereby a desired file can be accurately selected and reprinted.

It is further understood by those skilled in the art that the foregoing description is preferred embodiments of the disclosed system and that various changes and modifications may be made in the present invention without departing from the spirit and scope thereof.

For example, a program, etc., for embodying the present invention is stored on a recording medium 71 and the storage contents of the recording medium 71 can be loaded into the host computer 41 through an I/F 72. A predetermined program is loaded into the printer 31 through the I/F from the host computer 41, whereby the printer 31 can be provided with the web server section 39. In addition to a physical recording media, such as floppy disk, CD-ROM, DVD-ROM, and memory card, a communication medium using a communication line for downloading can be contained as the recording medium 71. To store a predetermined program on the recording medium 71, for example, the recording medium 71 can be represented as:

A computer-readable recording medium for recording a program to cause a computer to execute the steps of receiving print data, determining whether or not storage specification is set in the print data, storing the print data in storage unit as a file if the storage specification is set, determining whether or not an attribute information transfer request is issued, collecting attribute information of the file stored in the storage unit if an attribute information transfer request is received, transferring the collected attribute information to the source issuing the attribute information transfer request, selecting a file whose contents are to be displayed based on the transferred attribute information, issuing an image data file transfer request for making a request for transferring an image data file of the selected file, determining whether or not the image data file transfer request is issued, reading the file stored in the storage unit if the image data file transfer request is issued, converting the read file into an image data file, transferring the image data file to the source issuing the image data file transfer request, selecting a file to be printed based on the transferred image data file, issuing a request for printing the selected file, determining whether or not a print request is issued, reading the file stored in the storage unit if the print request is received, and causing print unit to print the read file.

It can also be represented as:

A computer-readable recording medium for recording a program to cause a computer to function as storage control unit for determining whether or not storage specification is set in print data and storing the print data in storage unit as a file if the storage specification is set, attribute information transfer unit being responsive to an input attribute information transfer request for transferring the attribute information of the file stored in the storage unit to the source issuing the attribute information transfer request, file conversion unit being responsive to an image data file transfer request input based on the attribute information for converting the file stored in the storage unit into an image data file, image data file transfer unit for transferring the image data file to the source issuing the image data file transfer request, and reprint unit being responsive to an input print request for reading the file stored in the storage unit and causing the print unit to print the file.

As shown in a modified example in FIG. 15, an delete button 81 for deleting a file stored in the storage unit 37 may be provided. In this case, preferably a file with secret specification can be deleted only if a password match is found.

As shown in FIG. 15, the check boxes may be omitted and a file may be selected with a so-called highlight bar 82. That is, if the user clicks on the display portion of a desired file, the displayed portion of the file is highlighted.

Figure 16:
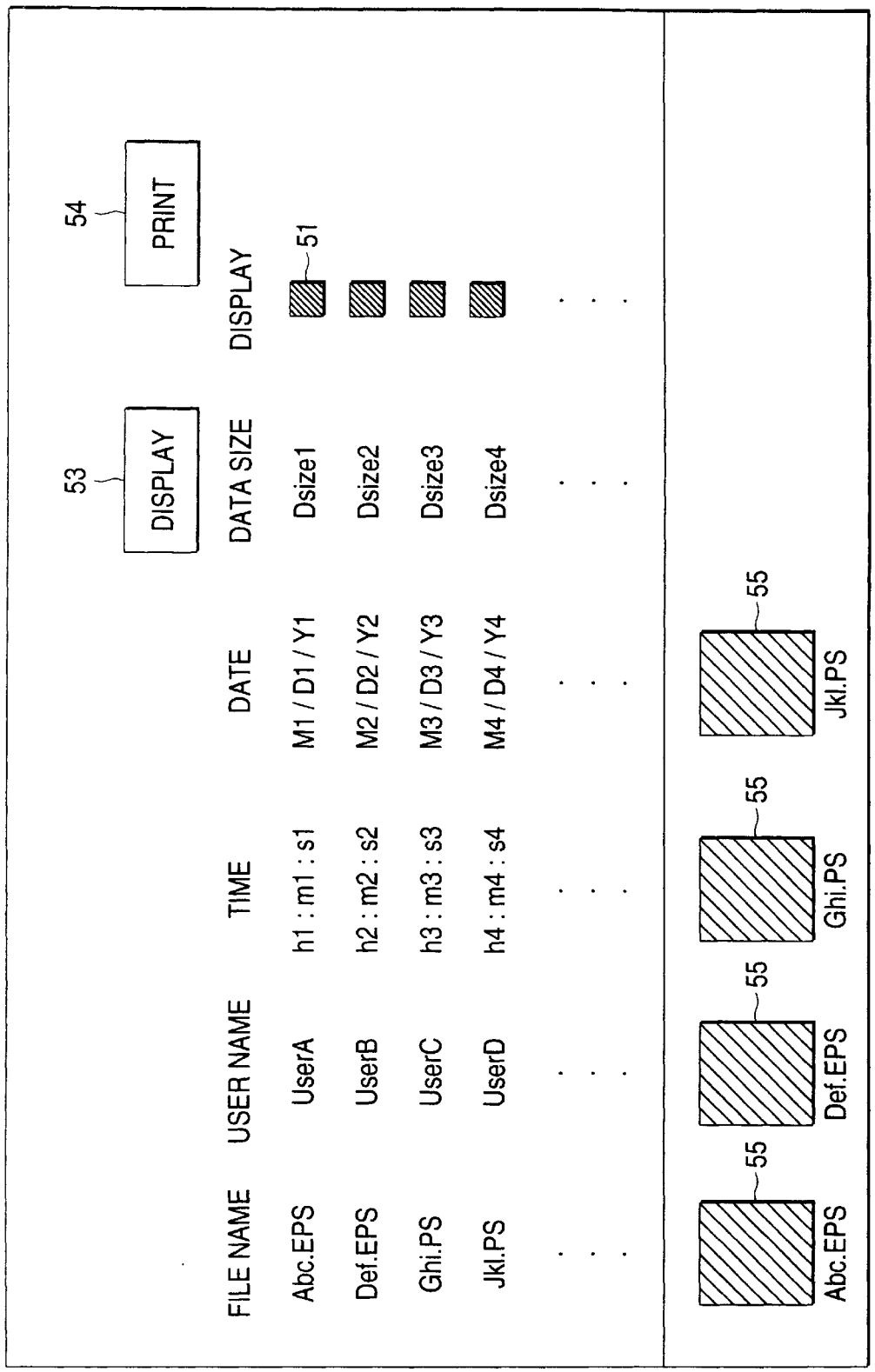
FIG. 16 is a schematic representation to show an attribute information and image data listing screen according to another modified example of the present invention.

As shown in another modified example in FIG. 16, a file attribution information listing screen and a selection image listing screen may be provided on a single monitor at the same time.

As has been discussed heretofore, according to the printing apparatus, the printing method, and the printing system of the present invention, the image data of the files selected by the user based on the attribute information is displayed for the user to select the file to be reprinted, so that the user can accurately specify any desired file for reprinting the file. Therefore, erroneous printing can be prevented and the printing efficiency can be improved.

What is claimed is:

1. A printing apparatus comprising:

print means for printing input print data on a print recording medium, the print means driven by the input print data;

storage means for storing the print data;

storage control means for determining whether or not storage specification is set in the print data and storing the print data in the storage means as a file of the storage specification is set;

attribute information transfer means for transferring attribute information of a file stored in the storage means to a source issuing an input attribute information transfer request in response to the input attribute information transfer request;

file conversion means for converting the file stored in the storage means into an image data file in response to an image data file transfer request input based on the attribute information;

image data file transfer means for transferring the image data file to a source issuing the image data file transfer request; and reprint means for reading the file stored in the storage means and causing the print means to print the file in response to an input print request.

2. The printing apparatus as set forth in claim 1, wherein the file conversion means converts the file stored in the storage means into bit image data and compresses the bit image data, thereby preparing the image data file.

3. The printing apparatus as set forth in claim 1, wherein the storage control means determines whether or not a secret specification is set in the print data and stores the print data in the storage means as a file in association with secret release information if the secret specification is set, and wherein if print of the file with the secret specification is specified in the print request, the reprint means determines whether or not entered secret release information matches the secret release information stored in the storage means, and reads the file stored in the storage means and causes the print means to print the file if the entered secret release information matches the secret release information stored in the storage means.

4. The printing apparatus as set forth in claim 1, wherein the attribute information transfer means transfers the attribute information in a listing format and wherein the image data file transfer means transfers the image data file in a listing format.

5. The printing apparatus as set forth in claim 2, wherein the storage control means determines whether or not a secret specification is set in the print data and stores the print data in the storage means as a file in association with secret release information if the secret specification is set, and wherein if print of the file with the secret specification is specified in the print request, the reprint means determines whether or not entered secret release information matches the secret release information stored in the storage means, and reads the file stored in the storage means and causes the print means to print the file if the entered secret release information matches the secret release information stored in the storage means.

6. The printing apparatus as set forth in claim 2, wherein the attribute information transfer means transfers the attribute information in a listing format and wherein the image data file transfer means transfers the image data file in a listing format.

7. The printing apparatus as set forth in claim 3, wherein the attribute information transfer means transfers the attribute information in a listing format and wherein the image data file transfer means transfers the image data file in a listing format.

8. The printing apparatus as set forth in claim 1, further comprising a display means for displaying files stored in the storage means which have attribute information selected by a user, wherein said file conversion means converts a file which is displayed by said display means and which is selected by said user.

9. The printing apparatus as set forth in claim 1, wherein the storage control means determines whether or not a secret specification is set in the print data and stores the print data in the storage means as a plurality of files in association with respective secret release information if the secret specification is set, and wherein if print of one of said plurality of files with the secret release information is specified in the print request, the reprint means determines whether or not entered secret release information matches the secret release information stored in the storage means, and reads the associated file stored in the storage means and causes the print means to print the file if the entered secret release information matches the secret release information stored in the storage means.

10. The printing apparatus as set forth in claim 2, wherein the storage control means determines whether or not a secret specification is set in the print data and stores the print data in the storage means as a plurality of files in association with respective secret release information if the secret specification is set, and wherein if print of one of said plurality of files with the secret release information is specified in the print request, the reprint means determines whether or not entered secret release information matches the secret release information stored in the storage means, and reads the associated file stored in the storage means and causes the print means to print the file if the entered secret release information matches the secret release information stored in the storage means.

11. A printing method of storing input print data in storage means and causing print means to print the print data in response to a print request, the printing method comprising the steps of:

receiving the print data;

determining whether or not storage specification is set in the print data;

storing the print data in the storage means as a file if the storage specification is set;

determining whether or not an attribute information transfer request is issued;

collecting attribute information of the file stored in the storage means if an attribute information transfer request is received;

transferring the collected attribute information to a source issuing the attribute information transfer request;

selecting a file whose contents are to be displayed based on the transferred attribute information;

issuing an image data file transfer request for making a request for transferring an image data file of the selected file;

determining whether or not the image data file transfer request is issued;

reading the file stored in the storage means if the image data file transfer request is issued;

converting the read file into an image data file;

transferring the image data file to a source issuing the image data file transfer request;

selecting a file to be printed based on the transferred image data file;

issuing a request for printing the selected file;

determining whether or not a print request is issued;

reading the file stored in the storage means if the print request is received; and causing the print means to print the read file.

12. The printing method as set forth in claim 11, further comprising the steps of:

determining whether or not a secret specification is set in the received print data;

storing respective secret release information in the storage mans in association with the plurality of files if the secret specification is set;

determining whether or not print of one of said plurality of files with the secret release information is requested if a print request is received;

determining whether or not entered secret release information matches the secret release information stored in the storage means if print of said one of said plurality of files with the secret specification is requested; and enabling read of the file requested to be printed from the storage means if the entered secret release information matches the secret release information stored in the storage means.

13. The printing method as set forth in claim 11, wherein the file converting step converts the file stored in the storage means into bit image data and compresses the bit image data, thereby preparing the image data file.

14. The printing method as set forth in claim 13, further comprising the steps of:

determining whether or not a secret specification is set in the received print data;

storing respective secret release information in the storage mans in association with the plurality of files if the secret specification is set;

determining whether or not print of one of said plurality of files with the secret release information is requested if a print request is received;

determining whether or not entered secret release information matches the secret release information stored in the storage means if print of said one of said plurality of files with the secret specification is requested; and enabling read of the file requested to be printed from the storage means if the entered secret release information matches the secret release information stored in the storage means.

15. The printing method as set forth in claim 11 further comprising the steps of:

determining whether or not a secret specification is set in the received print data;

storing secret release information in the storage means in association with the file if the secret specification is set;

determining whether or not print of the file with the secret specification is requested if a print request is received;

determining whether or not entered secret release information matches the secret release information stored in the storage means if print of the file with the secret specification is requested; and enabling read of the file requested to be printed from the storage means if the entered secret release information matches the secret release information stored in the storage means.

16. The printing method as set forth in claim 11, wherein the attribute information transferring step transfers the attribute information in a listing format and wherein the image data file transferring step transfers the image data file in a listing format.

17. The printing method as set forth in claim 13 further comprising the steps of:
determining whether or not a secret specification is set in the received print data;
storing secret release information in the storage means in association with the file if the secret specification is set;
determining whether or not print of the file with the secret specification is requested if a print request is received;
determining whether or not entered secret release information matches the secret release information stored in the storage means if print of the file with the secret specification is requested; and
enabling read of the file requested to be printed from the storage means if the entered secret release information matches the secret release information stored in the storage means.

18. The printing method as set forth in claim 13, wherein the attribute information transferring step transfers the attribute information in a listing format and wherein the image data file transferring step transfers the image data file in a listing format.

19. The printing method as set forth in claim 15, wherein the attribute information transferring step transfers the attribute information in a listing format and wherein the image data file transferring step transfers the image data file in a listing format.

20. A printing system comprising:
a print data preparation unit for preparing print data; and
a printing apparatus, the printing apparatus including:
print means for printing input print data on a print recording medium, the print means driven by the input print data;
storage means for storing the print data;
storage control means for determining whether or not storage specification is set in the print data and storing the print data in the storage means as a file if the storage specification is set;
attribute information transfer means being responsive to an attribute information transfer request input from the print data preparation unit for transferring attribute information of the file stored in the storage means to the print data preparation unit;
file conversion means for converting the file stored in the storage means into an image data file in response to an image data file transfer request input from the print data preparation unit based on the attribute information;
image data file transfer means for transferring the image data file to the print data preparation unit; and
reprint means for reading the file stored in the storage means and causing the print means to print the file in response to an input print request,
the print data preparation unit including:
print data preparation means for preparing the print data based on input data; and
read means for inputting the attribute information transfer request, the image data transfer request, and the print request to the printing apparatus.

21. The printing system as set forth in claim 20 further comprising a display means for displaying files stored in the storage means which have attribute information selected by a user, wherein said file conversion means converts a file which is displayed by said display means and which is selected by said user.

22. The printing apparatus as set forth in claim 20, wherein the storage control means determines whether or not a secret specification is set in the print data and stores the print data in the storage means as a plurality of files in association with respective secret release information if the secret specification is set, and wherein if print of one of said plurality of files with the secret release information is specified in the print request, the reprint means determines whether or not secret release information entered through the read means matches the secret release information stored in the storage means, and reads the associated file stored in the storage means and causes the print means to print the file if the entered secret release information matches the secret release information stored in the storage means.

23. The printing system as set forth in claim 20, wherein the file conversion means converts the file stored in the storage means into bit image data and compresses the bit image data, thereby preparing the image data file.

24. The printing apparatus as set forth in claim 23, wherein the storage control means determines whether or not a secret specification is set in the print data and stores the print data in the storage means as a plurality of files in association with respective secret release information if the secret specification is set, and wherein if print of one of said plurality of files with the secret release information is specified in the print request, the reprint means determines whether or not secret release information entered through the read means matches the secret release information stored in the storage means, and reads the associated file stored in the storage means and causes the print means to print the file if the entered secret release information matches the secret release information stored in the storage means.

25. The printing system as set forth in claim 20, wherein the storage control means determines whether or not a secret specification is set in the print data and stores the print data in the storage means as a file in association with secret release information if the secret specification is set, and wherein if print of the file with the secret specification is specified in the print request, the reprint means determines whether or not secret release information entered through the read means matches the secret release information stored in the storage means, and reads the file stored in the storage means and causes the print means to print the file if the entered secret release information matches the secret release information stored in the storage means.

26. The printing system as set forth in claim 20, wherein the attribute information transfer means transfers the attribute information in a listing format and wherein the image data file transfer means transfers the image data file in a listing format.

27. The printing system as set forth in claim 23, wherein the storage control means determines whether or not a secret specification is set in the print data and stores the print data in the storage means as a file in association with secret release information if the secret specification is set, and wherein if print of the file with the secret specification is specified in the print request, the reprint means determines whether or not secret release information entered through the read means matches the secret release information stored in the storage means, and reads the file stored in the storage means and causes the print means to print the file if the entered secret release information matches the secret release information stored in the storage means.

28. The printing system as set forth in claim 23, wherein the attribute information transfer means transfers the attribute information in a listing format and wherein the image data file transfer means transfers the image data file in a listing format.

29. The printing system as set forth in claim 25, wherein the attribute information transfer means transfers the attribute information in a listing format and wherein the image data file transfer means transfers the image data file in a listing format.

30. A printing system comprising:
  image data input means for inputting image data;
  a printing apparatus; and
  read means for reading the contents of the image data stored in the storage means and issuing a print request to the printing apparatus,
  the printing apparatus including:
    print means for printing input print data on a print recording medium, the print means driven by the input print data;
    storage means for storing the print data;
    attribute information transfer means for transferring attribute information of the file stored in the storage means to the read means in response to an attribute information transfer request from the read means;
    image data file transfer means for transferring the file stored in the storage means to the read means in response to an image data file transfer request input from the read means based on the attribute information; and
    reprint means for reading the file stored in the storage means and causing the print means to print the file in response to a print request input from the read means.

31. The printing system as set forth in claim 30, further comprising a display means for displaying files stored in the storage means, which files have attribute information selected by a user, and file conversion means for converting a file stored in the storage means which file is displayed by said display means and selected by said user into an image data file in response to an image data file transfer request input based on the attribute information.

32. A computer-readable recording medium for recording a program to cause a computer to function as:
  storage control means for determining whether or not storage specification is set in print data and storing the print data in storage means as a file if the storage specification is set;
  attribute information transfer means for transferring the attribute information of the file stored in the storage means to the source issuing the attribute information transfer request in response to an input attribute information transfer request;
  file conversion means for converting the file stored in the storage means into an image data file in response to an image data file transfer request input based on the attribute information;
  image data file transfer means for transferring the image data file to the source issuing the image data file transfer request; and
  reprint means for reading the file stored in the storage means and causing the print means to print the file in response to an input print request.

33. A computer-readable recording medium for recording a program to cause a computer to execute the steps of:

receiving print data;
determining whether or not storage specification is set in the print data;
storing the print data in storage means as a file if the storage specification is set;
determining whether or not an attribute information transfer request is issued;
collecting attribute information of the file stored in the storage means if an attribute information transfer request is received;
transferring the collected attribute information to the source issuing the attribute information transfer request;
selecting a file whose contents are to be displayed based on the transferred attribute information;
issuing an image data file transfer request for making a request for transferring an image data file of the selected file;
determining whether or not the image data file transfer request is issued;
reading the file stored in the storage means if the image data file transfer request is issued;
converting the read file into an image data file;
transferring the image data file to the source issuing the image data file transfer request;
selecting a file to be printed based on the transferred image data file;
issuing a request for printing the selected file;
determining whether or not a print request is issued;
reading the file stored in the storage means if the print request is received; and
causing print means to print the read file.

34. A printing method of storing input print data in storage means and causing print means to print the print data in response to a print request, the printing method comprising the steps of:
receiving the print data;
determining whether or not storage specification is set in the print data;
storing the print data in the storage means as a plurality of files if the storage specification is set;
determining whether or not an attribute information transfer request is issued;
collecting attribute information of the file stored in the storage means if an attribute information transfer request is received;
transferring the collected attribute information to a source issuing the attribute information transfer request;
selecting files whose contents are to be displayed based on the transferred attribute information;
issuing an image data file transfer request for making a request for transferring an image data file of the selected file;
determining whether or not the image data file transfer request is issued;
reading one of said plurality of files stored in the storage means if the image data file transfer request is issued;
converting the read file into an image data file;
transferring the image data file to a source issuing the image data file transfer request;
selecting a file to be printed based on the transferred image data file;

issuing a request for printing the selected file;

determining whether or not a print request is issued;

reading the file stored in the storage means if the print request is received;

causing the print means to print the read file.

35. A printing apparatus comprising:

print means for printing input print data on a print recording medium, the print means driven by the input print data;

storage means for storing the print data;

storage control means for determining whether or not storage specification is set in the print data and storing the print data in the storage means as a file of the storage specification is set;

attribute information transfer means for transferring attribute information of files stored in the storage means to a source issuing an input attribute information transfer request in response to the input attribute information transfer request;

file conversion means for converting the files stored in the storage means into an image data file in response to an image data file transfer request input based on the attribute information;

image data file transfer means for transferring the image data file to a source issuing the image data file transfer request; and reprint means for reading a file stored in the storage means and selected by a user and causing the print means to print the selected file in response to an input print request.

36. The printing apparatus of claim 35, further comprising display means for displaying files stored in the storage means which have attribute information selected by a user.

* * * * *